US005694551A

United States Patent [19]
Doyle et al.

[11] Patent Number: 5,694,551
[45] Date of Patent: Dec. 2, 1997

[54] COMPUTER INTEGRATION NETWORK FOR CHANNELING CUSTOMER ORDERS THROUGH A CENTRALIZED COMPUTER TO VARIOUS SUPPLIERS

[75] Inventors: John D. Doyle, Libertyville; Anthony P. Hoholik, Gurnee; Dennis P. Groth, Grayslake, all of Ill.

[73] Assignee: Moore Business Forms, Inc., Grand Island, N.Y.

[21] Appl. No.: 427,495

[22] Filed: Apr. 24, 1995

Related U.S. Application Data

[63] Continuation of Ser. No. 63,755, May 20, 1993, abandoned.
[51] Int. Cl.[6] ............................................. G06F 151/00
[52] U.S. Cl. ............................................. 395/226; 395/234
[58] Field of Search ............................. 364/401, 402, 364/403, 408; 395/201, 208, 210, 226, 207, 228, 230, 235, 234

[56] References Cited

U.S. PATENT DOCUMENTS

| | | |
|---|---|---|
| 4,621,325 | 11/1986 | Naftzger et al. . |
| 4,658,987 | 4/1987 | Fink, Jr. . |
| 4,694,397 | 9/1987 | Grant et al. . |
| 4,713,761 | 12/1987 | Sharpe et al. . |
| 4,958,280 | 9/1990 | Pauley et al. .................. 364/401 R |
| 4,972,318 | 11/1990 | Brown et al. ................... 364/401 R |
| 4,975,841 | 12/1990 | Kehnemuyi et al. .................. 364/401 |
| 4,984,155 | 1/1991 | Geier et al. ........................ 364/401 |
| 4,992,940 | 2/1991 | Dworkin . |
| 5,117,353 | 5/1992 | Stipanovich et al. . |
| 5,117,354 | 5/1992 | Long et al. . |
| 5,168,444 | 12/1992 | Cukor et al. ........................ 364/401 |
| 5,204,821 | 4/1993 | Inui et al. ............................ 364/403 |
| 5,224,034 | 6/1993 | Katz et al. ........................... 364/401 |
| 5,231,566 | 7/1993 | Blutinger et al. .................... 364/401 |
| 5,319,542 | 6/1994 | King, Jr. et al. .................... 364/401 |

Primary Examiner—Robert A. Weinhardt
Attorney, Agent, or Firm—Nixon & Vanderhye P.C.

[57] ABSTRACT

An electronic requisitioning system for channeling customer requisition orders to internal suppliers and outside vendors, and processing invoices using a centralized computer system. A customer accesses an electronic item catalog and requisition form to place an order transmitted to the central computer system. Requisitions are segregated by supplier and sent as purchase orders to appropriate internal suppliers and outside vendors that ship the items directly to the customer. Invoices are centrally processed and the customer receives a combined invoice for all items requisitions and may transmit payment back through to the central computer system.

9 Claims, 30 Drawing Sheets

```
ICO1                CHANNEL/INTEGRATED SUPPLIER SYSTEM              MM-DD-YYYY
                              SYSTEM MENU                           HH:MM   AM

CUSTOMER NUMBER..:  9999999999
            CUSTOMER NAME....:  TEST CUSTOMER

1. NEW REQUISITION ENTRY
                        2. REQUISITION STATUS INQUIRY
                        3. CHANGE REQUISITION
                        4. DELETE REQUISITION
                        5. ITEM CATALOG INQUIRY
                        6. EXIT SYSTEM

SELECT A FUNCTION:   _

PFK: 1=HELP; 3=EXIT
```

```
ICO2                CHANNEL/INTEGRATED SUPPLIER SYSTEM         01-20-1992
                         NEW REQUISITION ENTRY                   03:05   PM

STATUS.........: ENTRYLVL           SHIP-TO ID..: 3-6543210-10002
REQUISITION #..:      329           SHIP-TO NAME: CUSTOMER NAME
REQUISITION DATE: 01-20-1992        ADDRESS 1...:
BANK CENTER....: 5101-0101537       ADDRESS 2...: 1 CUSTOMER'S LOCATION
ORDERED BY.....:                    CITY........: CHICAGO
PHONE NUMBER...:                    STATE.......: IL  ZIP: 606060000
REMARKS........:
HOLD REQUISITION (Y/N) ? N

LINE  ITEM NUMBER   QUANTITY  UM   QTY/UM ITEM DESCRIPTION
 1    AB16RB             46   BX     1   RUBBER BANDS              NONE
 2    AM21452            35   CS     1   5X8 SCRATCH PADS          WHITE
 3    AM47103            58   DZ     1   2 1/2 ADD ROLL            WHITE
 4    _____
 5    _____
 6    _____
 7    _____
 8    _____

PFK: 1=HELP; 3=SAVE; 7=PG BWD; 8=PG FWD; 10=CATALOG; 12=CANCEL
```

Fig 7

```
IC04            CHANNEL/INTEGRATED SUPPLIER SYSTEM                01-21-1992
                   INQUIRY REQUISITION SELECTION                     10:11  AM

REQUISITION NBR.......:  _____              BANK CENTER: _____
REQUISITION STATUS....:  _____
REQUISITION DATE FROM: 01-01-1991     TO: _____

------- ENTER INFORMATION ABOVE TO LIMIT REQUISITION SELECTIONS -------

REQN NUMBER    DATE         STATUS     ORDERED BY    PHONE # / EXT
 $       214    12-11-1991     SHIPPED        JDK            6284
 _       215    12-11-1991     TRANSMIT       JDK            6284
 _       216    12-11-1991     TRANSMIT       JDK            6482
 _       217    12-11-1991     TRANSMIT
 _       218    12-12-1991     TRANSMIT                       999
 _       219    12-12-1991     TRANSMIT
 _       220    12-12-1991     TRANSMIT
 _       221    12-12-1991     TRANSMIT

PAGE 07  * MORE PAGES *                             BROWSE FROM (Y/N):N
PLACE CURSOR ON REQN LINE, KEY "S" AND PRESS ENTER TO DISPLAY DETAIL

PFK:  1=HELP;   3=EXIT;   5=REFRESH;   7=PG BWD;   8=PG FWD;   12=CANCEL
```

1059 (pointing to $ column)

Fig 10

```
IC05                    CHANNEL/INTEGRATED SUPPLIER SYSTEM              01-21-1992
                              REQUISITION INQUIRY                         12:57  PM

STATUS..........: IN-PROC           SHIP-TO ID..: 3-65453210-10088
REQUISITION #...:     214           SHIP-TO NAME: CUSTOMER NAME
REQUISITION DATE: 12-11-1991        ADDRESS 1...:
BANK CENTER.....: 5101-0101007      ADDRESS 2...: 1 CUSTOMER'S LOCATION
ORDERED BY......: JDK               CITY........: CHICAGO
PHONE NUMBER....: 6284              STATE.......: IL  ZIP: 606060000
REMARKS.........:

LNE ITEM NUMBER    QUANTITY UM ITEM DESCRIPTION               STATUS      DATE
$  1  B-89                10   RL PLASTIC BAGS/GREEN             SHIPPED    01-21-1992
|  2  BC 1001              10   PK EASY PAY                      IN-PROC    12-11-1991
|  3  BC 1003              10   BX MERCHANT DEP ENVELOPE         IN-PROC    12-11-1991
|  4  BC 1004              10   PK BANK CR CARD SUMM TRAN        IN-PROC    12-11-1991
|  5  BMS-001A             10   CT TELLER TAPE SHARP 2-PL        IN-PROC    12-11-1991
|  6  BMS-003B             10   CT TELLER TAPE 3-7/16 2-P        SHIPPED    12-11-1991
|  7  BMS-005              10   BX TELLER TAPE 2 PLY IBM         IN-PROC    12-11-1991
|  8  BMS-006              10   CT PROOF 3.5X5.5  1-PLY          BACKORD    12-11-1991

PAGE  01 * MORE PAGES *             START BROWSE LINE NBR :
PLACE CURSOR ON DETAIL LINE, KEY "S" AND PRESS ENTER TO DISPLAY STATUS

PFK: 1=HELP; 3=EXIT; 7=PG BWD; 8=PG FWD; 12=CANCEL
```

Fig 11

```
IC07              CHANNEL/INTEGRATED SUPPLIER SYSTEM              01-21-1991
                  REQUISITION DETAIL LINE STATUS INQUIRY               04:07 PM

REQUISITION NBR.:  214    DATE... 12-11-1991   STATUS... IN PROC

LINE NBR.....  1
ITEM NUMBER..  B-89                QTY ORD..    10   STATUS.. SHIPPED
DESCRIPTION..  PLASTIC BAGS/GREEN  SHIP QTY.    10   DATE.... 01-21-1992
                                   QTY B/O..     0

VEND                                          BILL OF LADING NUMBER
SEQ STAT QTY SHIPPED DATE SHIP CARRIER
 1   AC         7  01-13-1992  UPS                92-3312779-A
 2   IS         3  01-17-1992  UPS                92-3313193-A

PAGE  01                              START BROWSE LINE NBR....: ____

PFK: 1=HELP; 3=EXIT; 7=PG BWD; 8=PG FWD; 12=CANCEL
```

Fig 12

```
IC26              CHANNEL/INTEGRATED SUPPLIER SYSTEM              MM-DD-YYYY
                         ITEM CATALOG INQUIRY                     HH:MM AM

PRODUCT GROUPS:
    1: FORMS              4: COMPUTER SUPPLIES     7:
    2: ENVELOPES          5:                       8:
    3: OFFICE SUPPLIES    6:                       9:

GROUP SELECTION..: 3
ITEM SEARCH......: PEN_____   DISPLAY SEQUENCE:  K  (K=KEYWORD, N=ITEM NBR)

QUANTITY  ITEM NUMBER   UM  QTY/UM  ITEM DESCRIPTION
          V1-ITEM1      EA    1     BALL POINT PEN - MED/R      RED
 26 24    V1-ITEM14     EA   12     PENCILS  #2                 GOLD
_____     V1-ITEM15     EA   25     VENDOR ITEM 15              SILVER
_____     V1-ITEM2      EA    1     BALL POINT PEN - MED/B      BLUE
_____     V1-ITEM3      EA    1     BALL POINT PEN - MED/B      BLACK
_____     V1-ITEM4      EA    1     BALL POINT PEN - MED/G      GREEN
_____     V1-ITEM5      EA    1     FELT TIP PEN - FINE/RE      RED
_____     V1-ITEM6      EA    1     FELT TIP PEN - FINE/BL      BLACK
PAGE  1  * MORE PAGES *

PFK: 1=HELP; 3=EXIT; 5=REFRESH; 7=PG BWD; 8=PG FWD; 10=REQN; 12=CANCEL
```

Fig 13

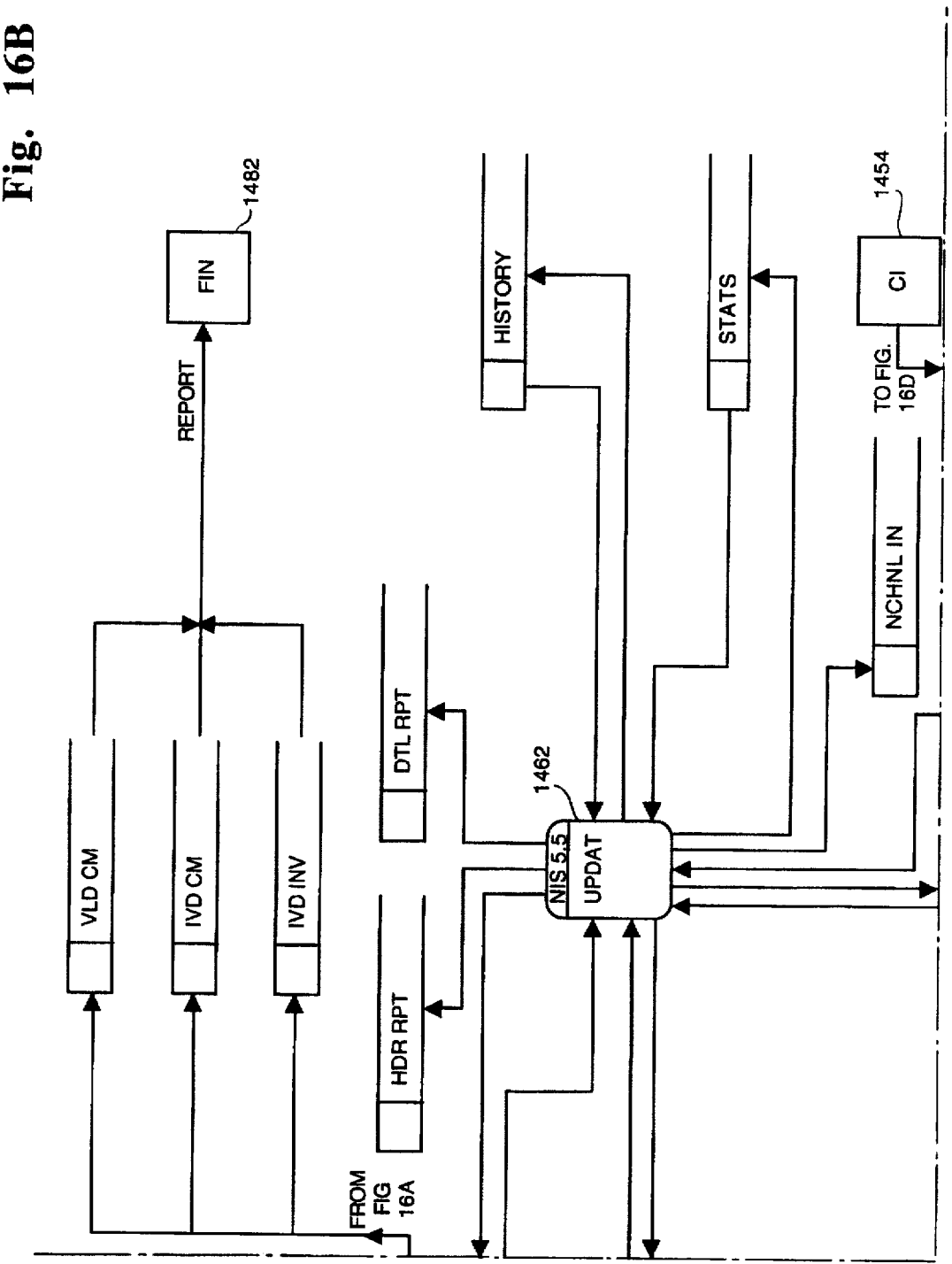

COMPUTER INTEGRATION NETWORK FOR CHANNELING CUSTOMER ORDERS THROUGH A CENTRALIZED COMPUTER TO VARIOUS SUPPLIERS

This is a continuation of application Ser. No. 08/063,755, filed May 20, 1993, now abandoned.

FIELD OF INVENTION

This invention relates to data processing for handling the ordering, order tracking and accounting of supplies. In addition, this invention relates to a centralized computer network for handling customer orders in conjunction with a variety of outside suppliers.

BACKGROUND AND SUMMARY OF THE INVENTION

FIG. 1 is a simplified schematic diagram of a typical channel flow system 10 for handling customer orders, delivery of goods, and the accounting for the orders and deliveries in a typical transaction for the ordering of office supplies. The customer 12 completes a hand written order form 14 for several different types of office supplies. This completed order form is forwarded to a central supplier "X" 16.

The central supplier processes the customer order by splitting the one completed customer order form into information for individual vendors and prepares several vendor order forms 18, 20, 22, and 24 for the various office supplies that the customer has ordered. For example, the customer may have ordered printer ink that is not stocked by the central supplier. The order for printer ink is placed on another order form and sent by facsimile to an outside vendor such as XYZ office supply 18. Similarly, an order for non-stocked business envelopes may be routed to the ABC envelope company 20.

The customer requisition orders 14 for supplies that are stocked by the central supplier 16 are entered 21 in the data processing system for that supplier. This data processing system routes the order to the appropriate departments, such as a custom forms warehouse 22 and a stock forms warehouse 24.

Each of the outside vendors and departments ships 26 the ordered products directly to the customer 12. The outside vendors submit separate invoices 28 for each completed order to a central invoicing service 30. Similarly, the departments route invoices electronically to the central invoice service via the data processing system for the central supplier. The central invoicing service prepares and submits itemized invoices 32 for all of the delivered products to the customer. The customer submits payment 33 to the central invoicing service which in turn pays the outside vendors and departments for the delivered products.

A copy of the customer invoice is also sent to a central customer assistance department 34 of the central supplier 16. This customer assistance department collects data on customer orders, delivery of orders 35 and invoicing for delivered products in a central database 36. This database is used to respond to customer inquires 38 regarding pending orders and provides a capability for cancelling and changing pending orders 40. In addition, this database allows for the generation of reports regarding the flow of orders, deliveries and payment which is used by the customers, central suppliers and outside vendors to perform their respective tasks.

The current channel processing system is labor intensive in that data regarding orders and deliveries are repeatedly keyed into different computer systems at the customer, central supplier and outside vendors. This system is prone to data entry errors. The current system is redundant in data processing in that several different computer systems perform many of the same tasks, such as for status inquiry, invoicing, order entry and processing.

There is a long felt need for a data processing network to efficiently handle all aspects of customer orders channeled to a central supplier and filled by departments of the central supplier or by outside vendors. Such a channeled data processing system has been developed. The system includes a central computer located at the central supplier. This central computer is coupled, such as via modems, to computers at customer, department and outside vendor sites. These coupled computer systems in combination with the central computer form a data processing network capable of handling the data processing requirements for customer orders, routing those orders to appropriate departments or vendors, delivery of the ordered products, invoicing and payments, customer assistance and report generation.

BRIEF DESCRIPTION OF THE DRAWINGS

The preferred embodiment of the invention is described in relation to the accompanying drawings. These drawings are as follows:

FIGS. 6, 7 and 10 to 13 show exemplary data display screens used with the present invention.

DETAILED DESCRIPTION OF THE DRAWINGS

Figure 1:
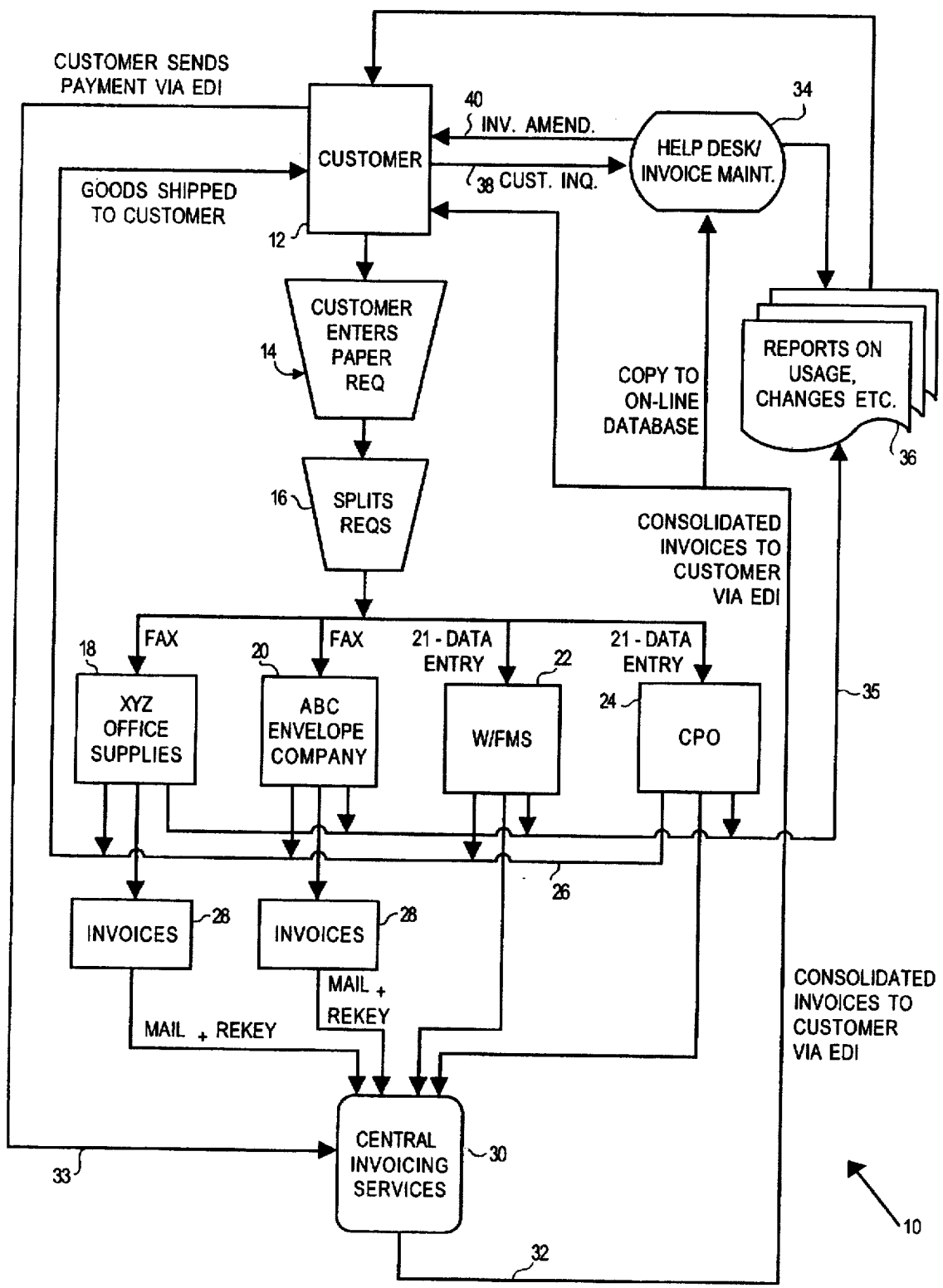
FIG. 1 is a schematic diagram of a prior art channel system.
Figure 2:
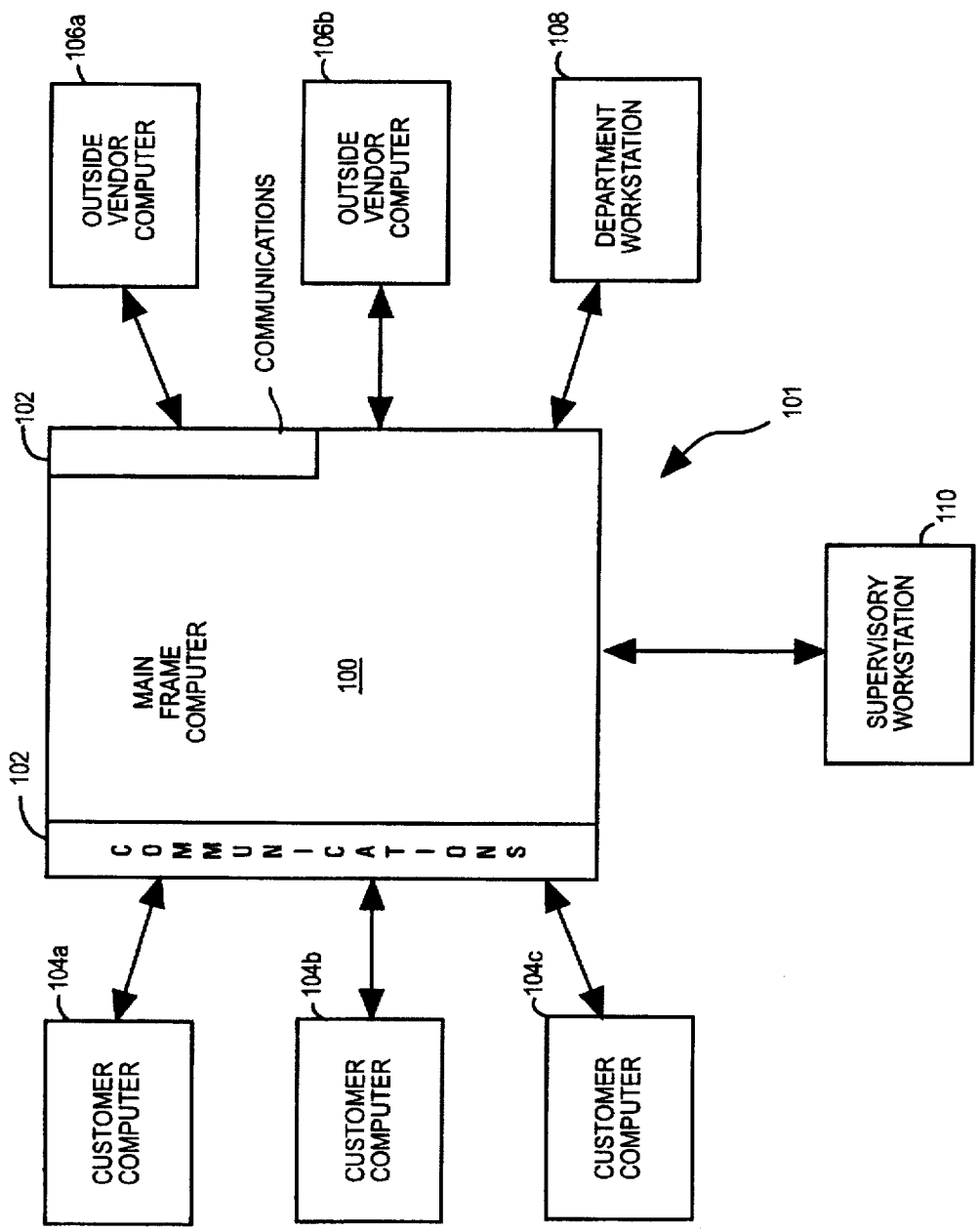
FIGS. 2 and 3 are block diagrams of an exemplary computer network for the subject invention.

FIG. 2 shows a block diagram of the data processing hardware used to implement the present invention. A mainframe computer 100, such as an IBM 3090 computer, located on site at the central supplier provides a centralized data processing for the entire channel supplier system 101. The mainframe computer includes communications hardware 102, such as modems, for communicating with customer computer systems 104(a–c) and outside vendor computer systems 106(a–b). In addition, the mainframe computer main communicates directly with department workstations 108 and supervisory workstations 110 of the central supplier.

The customer computer systems may be, for example, an individual personal computer 104a at a small customer, a computer network 104b at another customer, or a mini- or main-frame computer at a large customer 104c. Similarly, the outside vendor computer systems may be personal computers 106a or other type of computer system or network 106b. The workstations and/or computer systems for departments and supervisors may be, for example, computer terminals or personal computers on a network coupled to the mainframe computer. The communications hardware, software and protocols for coupling the mainframe computer with the workstations is conventional and well known to persons skilled in the art. In addition, the workstations and mainframe computer may be connected to bank computers to process electronic fund transfer information between customers, central supplier and outside vendors.

The mainframe computer executes a transaction software program described below to collect and process the data for customer order, shipment tracking and invoicing. This data is maintained 208 in a conventional database format for access by the transaction software and by conventional report generation software. In addition, the databases 102' include data on customers 122, customer requisitions 124, on supply catalog items 126, invoicing 130 and general reference data 128.

Figure 3:
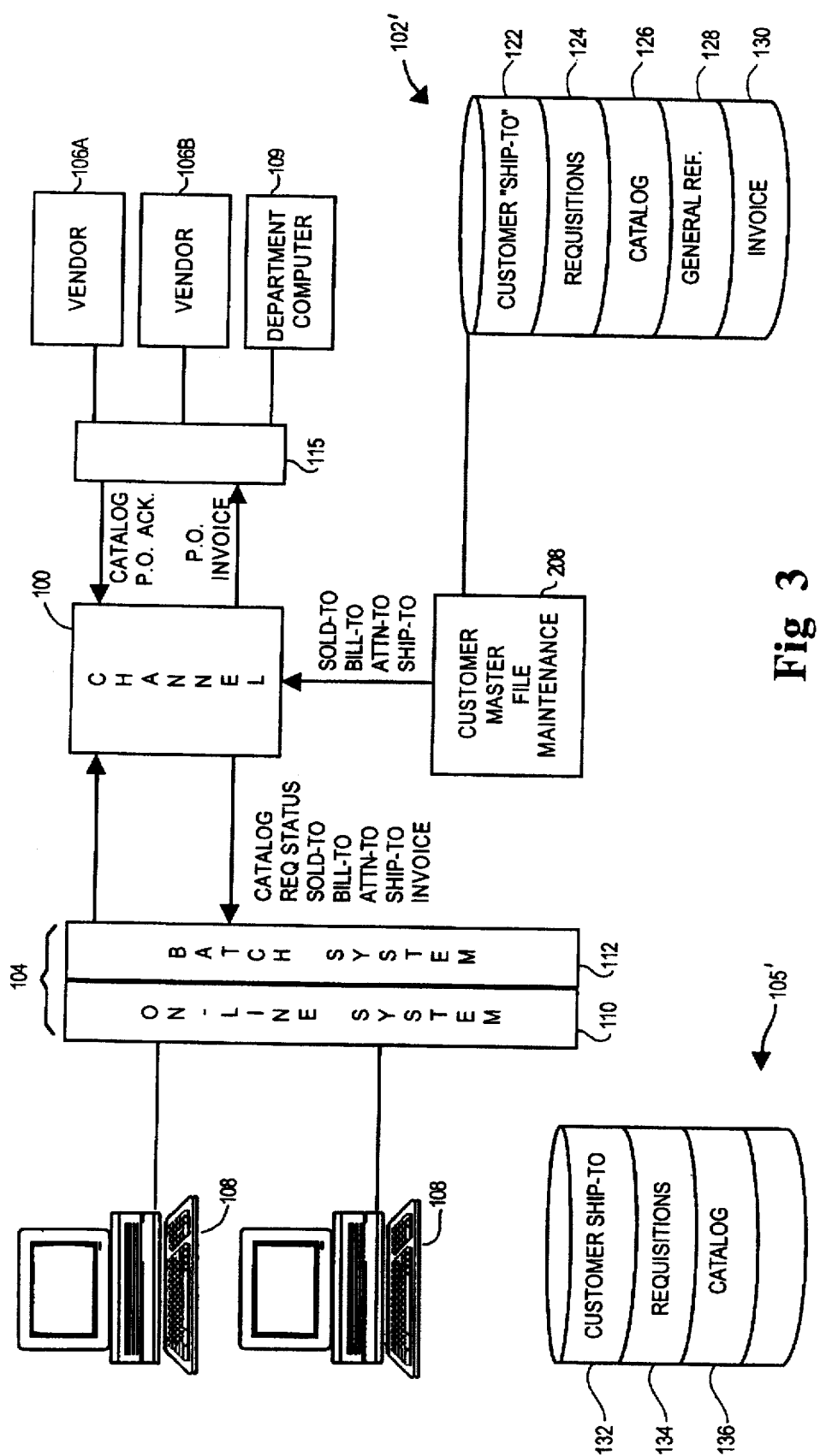

FIG. 3 is a high-level block-diagram of the data processing flow in the system. On the mainframe computer 100 at the central supplier, the transaction program 1000 (FIG. 4) is executed to centrally process the data in the system and maintain 208 databases 102'. These central databases may include individual databases on the customer 122, e.g. ship-to information, pending requisitions 124, master product item catalog 126, general reference information 128 such as product class codes and product groups, and invoicing 130. Similar databases 105' can be maintained in each customer computer system 104 if the customer system is compatible with the central mainframe computer 100. Customer databases 105' contain information inputted at the customer workstations 108 and information periodically exchanged between the customer computer system 104 and the central supplier computer system 100.

Each customer computer system 104 performs on-line 110 and batch processing 112 operations. On-line operations generally occur when a customer user accesses the customer database 105 through a workstation 108. For example, the customer database contains information regarding the customer authorization and delivery locations, e.g. "ship to" information 132, pending requisition orders such as items ordered, quantity and price 134, and a copy of the portion of the product catalog accessible to that customers 136. The main product catalog 126 maintained in databases in the central computer 100 is massive and each customer, during a set up phase, selects the portion of the catalog that is to be accessible to its authorized users. An authorized customer employee logs onto the on-line sub-system and interacts with customer databases in real time to order products, inquire into the status of pending requisitions, and browse and order directly from the catalog.

The data entered by the customer employee is stored in the customer database 105'. The customer database and the main system databases 102' are periodically updated by operation of the batch processing system 112 operated on the customer computer system. A complementary batch process occurs on the main computer system.

The vendor computer systems 106 (A&B) and possibly with internal department computer systems 109, e.g., supply warehouse computer systems, interface with the main computer system 100 via a conventional interfacing equipment and software 115. The main computer system and the vendor system exchange data, such as purchase orders, purchase order acknowledgments and invoices in a standard formats, such as those established as Electronic Data Interchange (EDI) standards. In addition, the vendor supplies the main system, either automatically or manually, with data regarding the vendor product item catalog.

Figure 4:
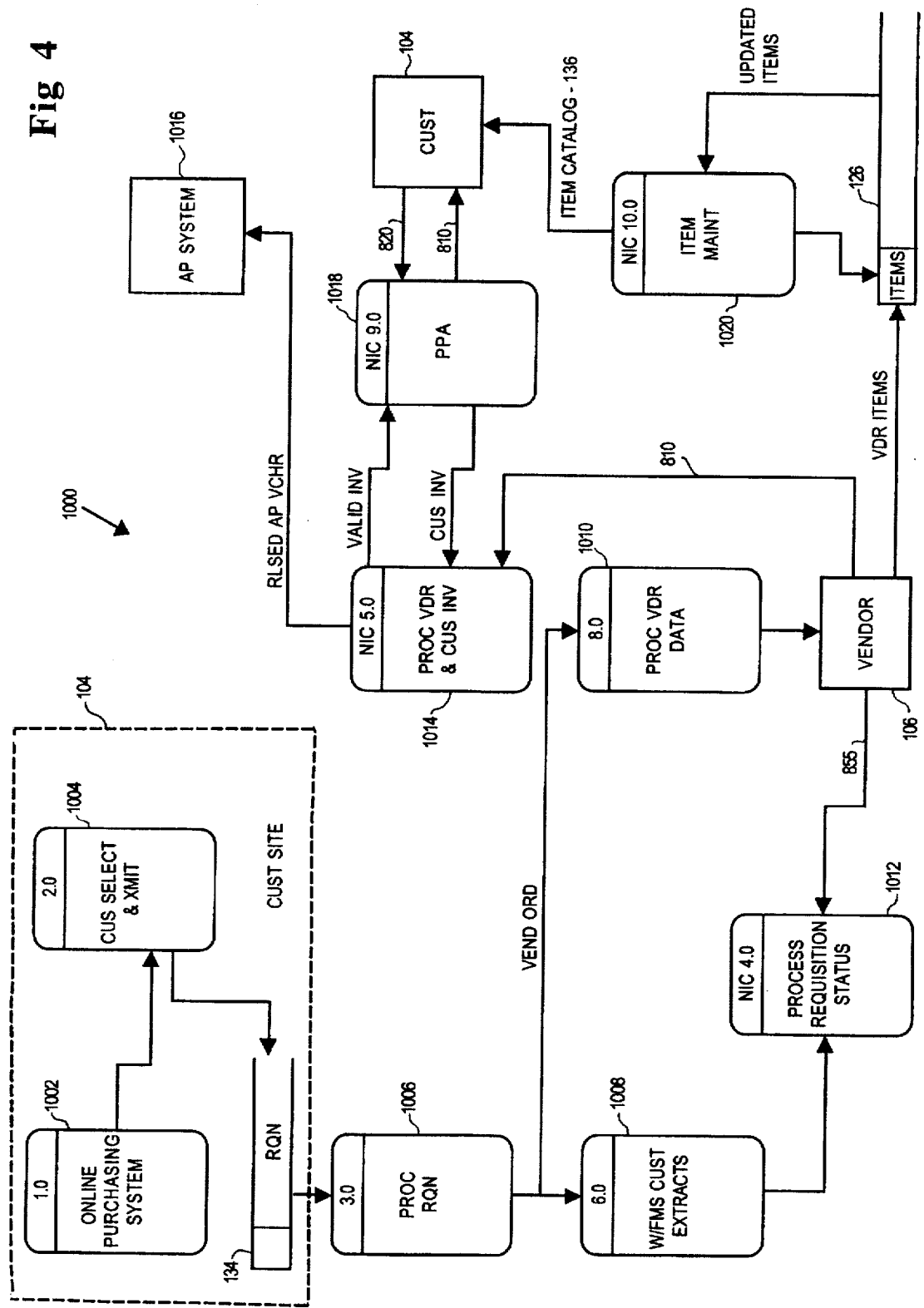
FIGS. 4, 5, 8, 9 and 14 to 26 show flowcharts of an exemplary program for the present invention.

FIG. 4 is a flowchart showing on a high level the process flow through the transaction program 1000. In step 1002, a customer retrieves and inputs data into the customer database 105' in the customer computer system 104. In step 1004, the customer selects information from its database and inputs information into the database, such as new requisition data 134. Periodically, such as once a day, new information added to the customer database, such as new requisitions data files, is transmitted to the main computer system 100 in step 1006. This information is used to update the databases 102' in the main system and, in particular, the requisition database 124.

In steps 1008 and 1010, the main computer system segregates data, such as requisition item information, from the data supplied by the customer and collates that information by individual vendors and internal departments. If the requisition item is to be delivered by an internal department, then the information needed to fulfill the order, such as ship-to and requisition item information is transmitted directly to the appropriate department computer system in step 1008. Similarly, if the requisition is to be fulfilled by an outside vendor, then the appropriate requisition (purchase order) information is transmitted to the vendor in step 1010. The status of purchase orders being filled by vendors is obtained by acknowledgement information provided by the vendor in step 1012. In addition, the system has the capability of monitoring costs, prices and other data, and generating reports regarding historical data trends and comparisons with current data.

Invoice data from outside vendors and internal departments is centrally processed in step 1014 and submitted to a central accounts payable department 1016. Invoices may be transmitted directly to the customer computer system, during the periodic data exchange, in step 1018. In return, payment information may flow from the customer to the main computer system.

The master item catalog 126 is periodically updated with information received from the individual vendors 106 in step 1020. Since the master catalog information includes data on the individual customers, e.g., those authorized to order individual items, the customer catalogs stored in each customer database are easily updated from the master item catalog.

Figure 5:
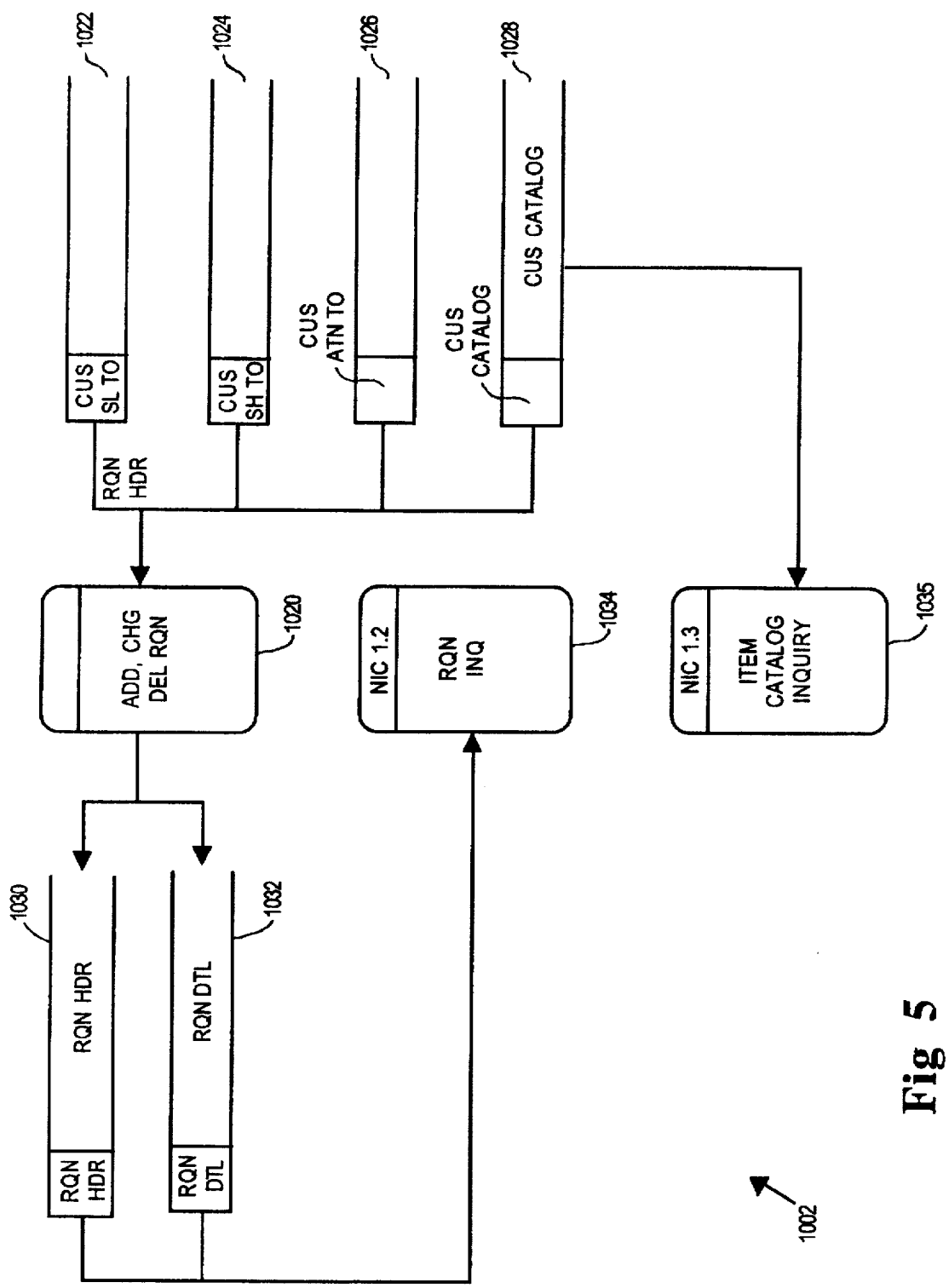

FIG. 5 shows the processing steps for the on-line purchasing system 110 executed at the customer computer system 104. An authorized user at a customer workstation initially selects a function operation from a system menu screen 1021 such as shown in FIG. 6. The available functions presented in the menu screen include entering a new requisition (FIG. 7), changing or deleting a requisition (step 1020). The system limits changes and deletions of requisitions to only those requisitions not completed and transmitted to the main computer system.

Pending (even non-completed) requisition data is accessible from the database on the customer computer system which may include data files on the customer that placed the requisition (CUS SLTD) 1022, the location to which the order is to be shipped (CUS SHTO) 1024, the customer person to whom the delivery is to be made (CUS ATN TO) 1026, and the catalog available to that customer (CUS CATALOG) 1028. This information is initially established during set-up of the customer connection to the main system and is maintained by the central computer system.

The customer database files are updated for new requisition orders, changes or deletions with information such as the requisition header 1030, (e.g., containing data on the requisition number, customer shipping location and other information not unique to the items ordered) and requisition details 1032, that includes information such as the item number, quantity order and customer price. An exemplary screen 1034 for making a requisition from a customer workstation is shown in FIG. 7. Data on pending requisitions may be retrieved from the customer database during a requisition inquiry in step 1034 via screens, such as shown in FIGS. 10 to 12. In addition, the menu functions may include a catalog inquiry in step 1035 and using a screen such as shown in FIG. 13.

Figure 8:
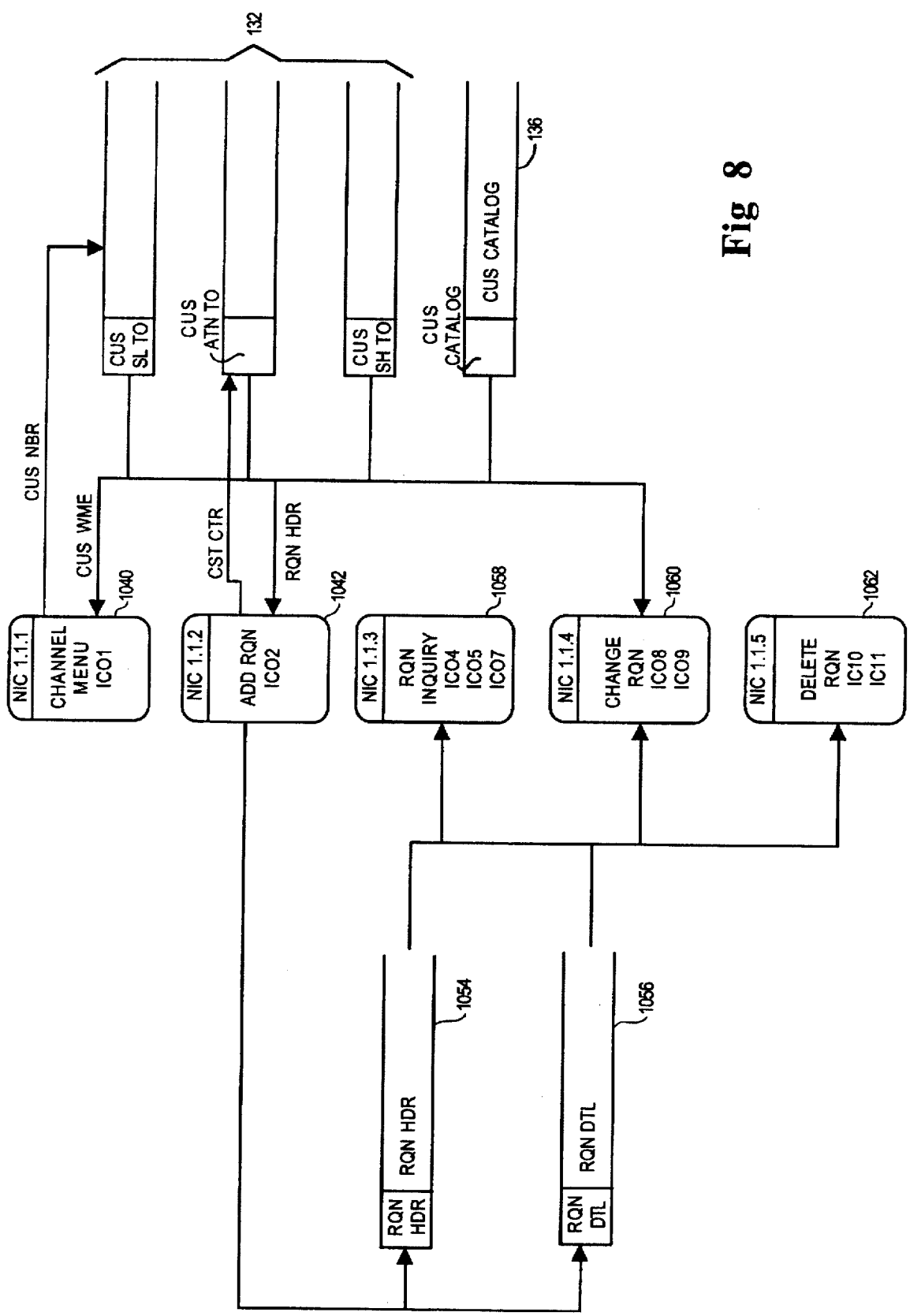

In particular, FIG. 8 shows the steps for entering a new requisition, or changing or deleting a pending requisition (or may be only an uncompleted requisition). From the initial menu 1021 (FIG. 6), at step 1040, the customer selects a function to add, change or delete a requisition. This selection causes the display of an appropriate screen such as shown in FIGS. 7 and 10 to 12. If a new requisition is to be added, a requisition screen 1034 (FIG. 7) is displayed on the customer workstation in step 1042. Upon entry of a location identification code, the requisition screen automatically presents data 1044 regarding the customer, particular customer site, other identifying information regarding the customer and the particular authorized customer user. This information is retrieved from the customer database and, in particular, from customer database files, such as ship-to, attention-to and sold-to files 132. In addition, the new requisition entry screen 1034 automatically displays an identifying requisition number and date 1046.

The customer enters product item data 1048, 1050 regarding the particular items to be requisitioned, including the selected item number 1048 and quantity 1050 of items. Information regarding items, item numbers and price may be obtained on-line from the customer catalog 136 via a catalog screen 1052, such as shown in FIG. 13. The customer catalog may be searched by product group or keyword. Quantity item ordering data 1051 may be entered directly into the catalog screen and the data then linked to the requisition screen. Information entered into the requisition screen 1058 is stored in the requisition database 134 of the customer computer system and, in particular, is segregated into requisition header information 1054 (e.g., requisition number, customer ship-to, and requisition date), and requisition detail information 1056 (such as requisitioned items, price and quantity).

Once stored, requisition information may be retrieved at the customer workstation via a requisition inquiry, step 1058 (and screen 1059 of FIG. 10), a requisition change, step 1060 or requisition delete function, step 1062, from the main menu shown in FIG. 6. The requisition status information will retrieve information on all pending requisitions (FIG. 10), items in a particular requisition (FIG. 11) and delivery order status (FIG. 12), provided that the main computer has updated the customer database with that information. This updating is accomplished on a periodic batch basis, such as once an day.

Figure 9:
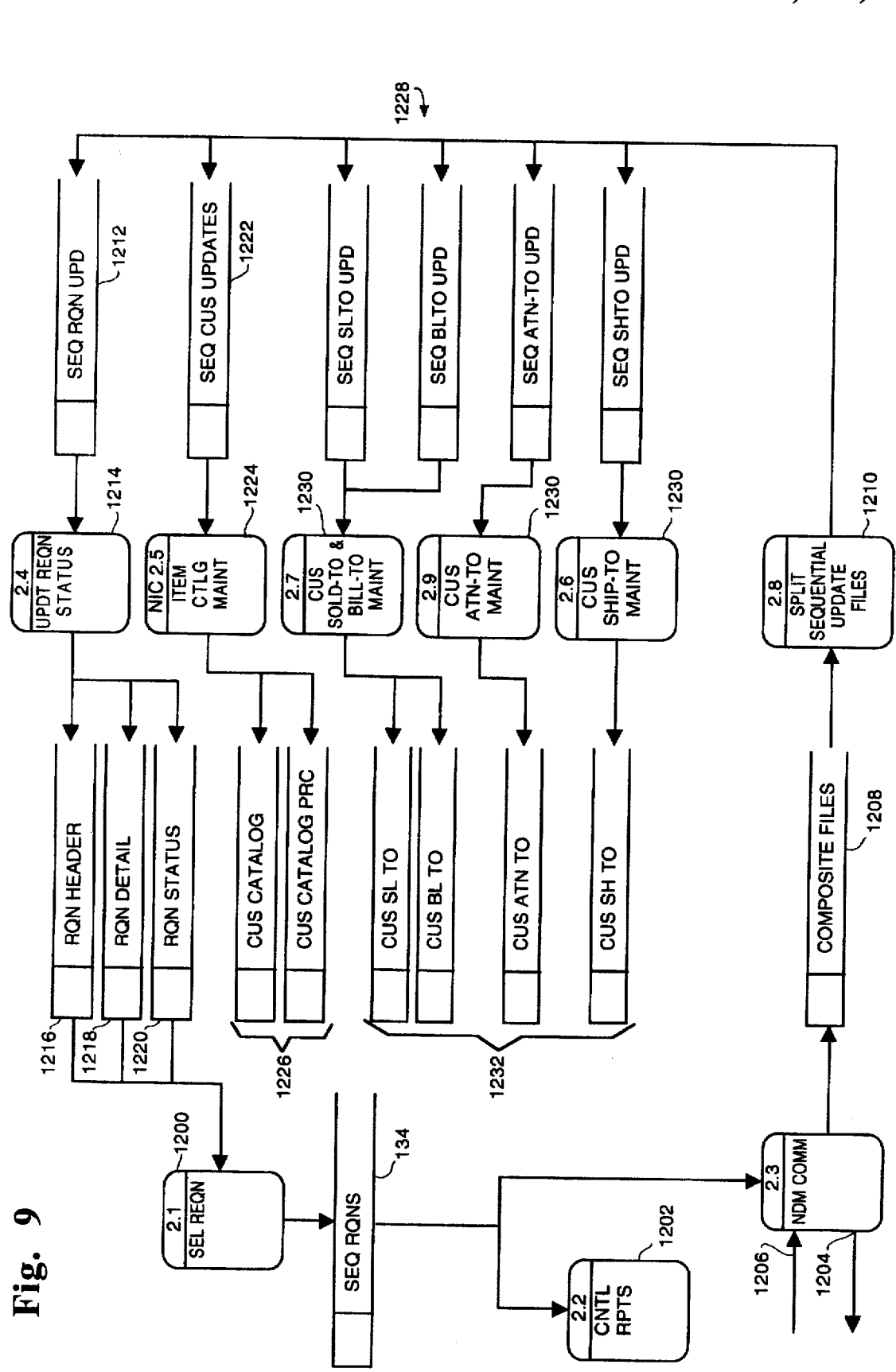

FIG. 9 shows a flowchart of the steps that occur when a customer makes a final requisition selection and that selection is transmitted to the main system computer. In step 1200, the customer enters a completed requisition order such as the screen 1034 shown in FIG. 7. The customer computer stores the completed requisition entry in its requisition database 134. Control reports are generated in step 1202 by the customer computer from its databases to provide the customer with information regarding its requisitions, such as totals of items ordered, prices and other information.

The new completed requisition information in the customer database is transmitted to the main system computer 100 during periodic batch processing in step 1204. Similarly, update information, e.g., purchase order acknowledgments, ship-to updates and product item updates, from the main computer is transmitted to the customer computer to update the customer database in step 1206.

Since all update information from the main system is transmitted only on a periodic batch basis, this information is transmitted to the customer computer as a composite update file, 1208. Upon receipt of this composite file, the customer computer splits the file to update the appropriate customer database files in step 1210.

For example, update information on requisitions is received as sequence requisition update information 1212 and the update information, in step 1214, is applied to the appropriate database(s) or files for requisition headers, 1216, requisition details, 1218, and requisition status, 1220. Control reports are generated at the customer site to provide adequate notice of new update information and may be provided to just one management user for each customer. Most update information is documented in control reports. Generally, control reports state the number and types of record files updated so that this information can be compared to the number of updates sent to the customer computer system.

Similarly, update information on the customer catalog (SEQ CUS UPDATES) 1222 is processed 1224 to update file items 1226 in the catalog database 136. Since the master catalog database 126 on the main computer correlates each catalog item entry by customer and price, the individual customer catalogs are readily updated. In addition, data files on a particular customer, such as to whom at the customer items are to be sold, billed, shipped and directed to the attention of, 1228, are updated at the main computer system 100 and then transmitted to the customer computer to update, step 1230, similar database files 1232 in the customer databases. The data in the catalog and customer update files are also documented in control reports. The initial customer specific information is entered when the customer is initially set up to interact with the main computer requisition system.

Figure 14A:
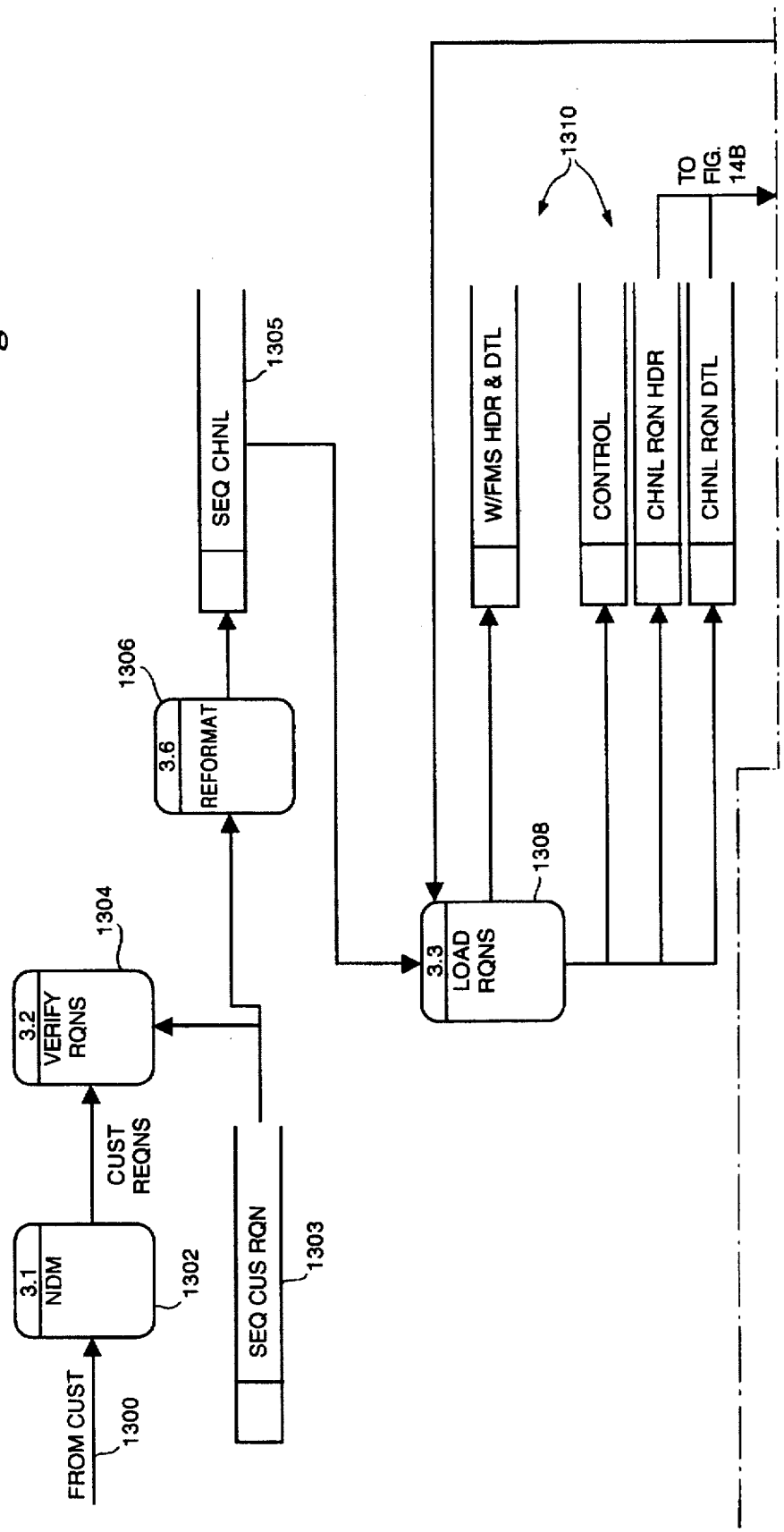
Figure 14B:
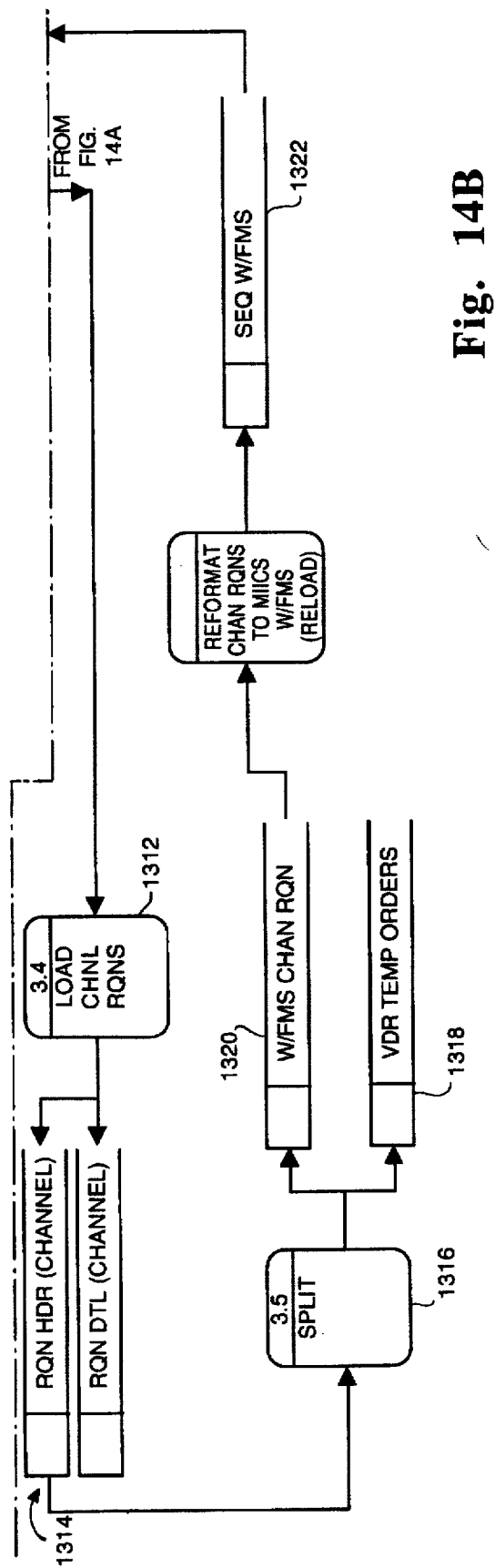

FIG. 14 shows the data processing steps for handling completed customer requisitions 1300 transmitted to the main system computer 100. The customer computer system transmits data files (SEQ CUS RQN) 1303 regarding requisitions in step 1302. The data transmitted is initially verified in step 1304 and reformatted to data files (SEQ CHNL) 1305 compatible with the main computer system in step 1306. In step 1308, the new requisition data files loaded into the requisition database 122, through appropriate data files 1310, such as header (HDR) and detail (DTL).

In step 1312, the data files loaded in the databases 102, is edited such that the customer number is converted, see data files 1314, to appropriate bill-to, ship-to, sold-to and attention-to data and then verified to ensure that the data is consistent with stored data and that the item numbers ordered conform to the item numbers in the master catalog 126. In step 1316, the requisition detail data on ordered items is split into data for the appropriate outside vendor, see data field 1318, and data for the appropriate internal departments, see data field 1320. The data fields for the internal departments is again reformatted in step 1322 for reloading back into the databases 102 of the main computer system. Generally, each internal department will maintain its own databases, separate from those of the main computer system, in a fashion similar to outside vendors.

Figure 15A:
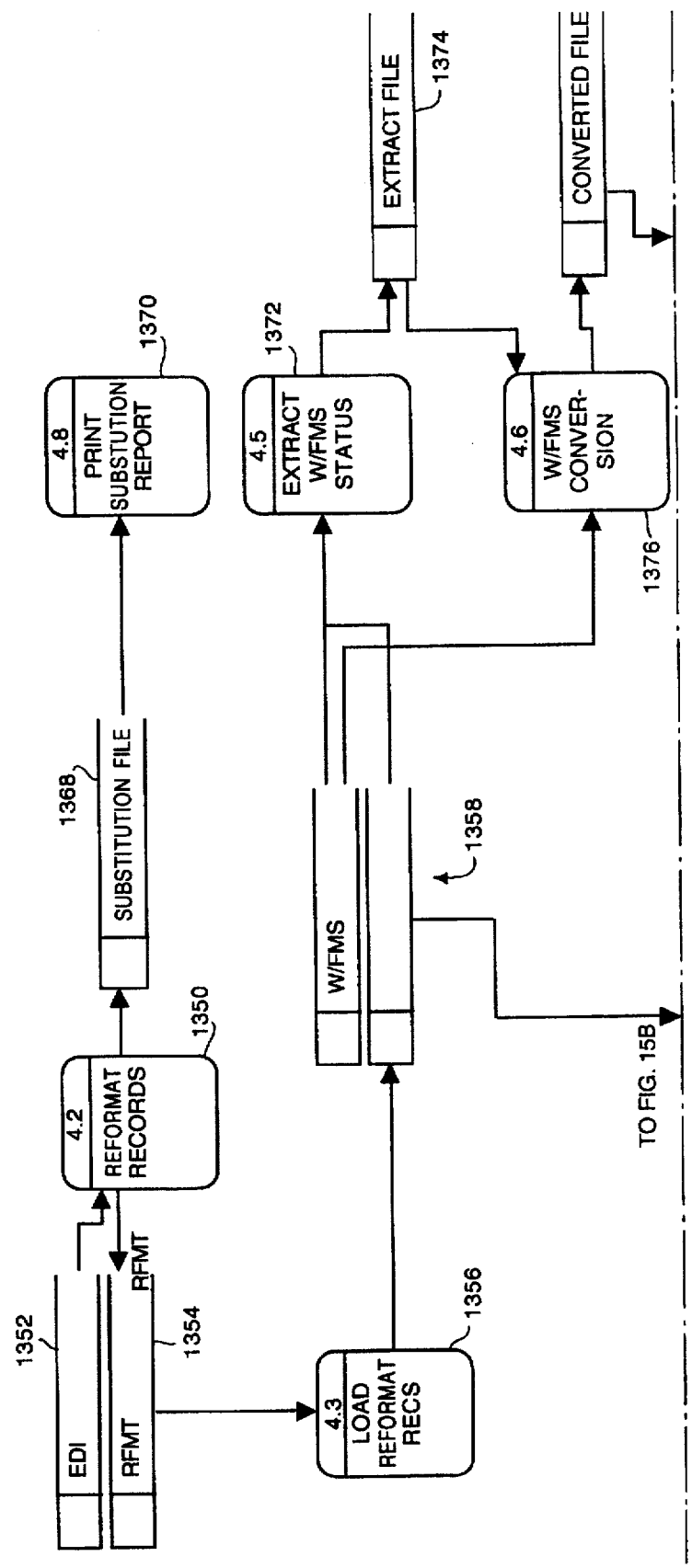
Figure 15B:
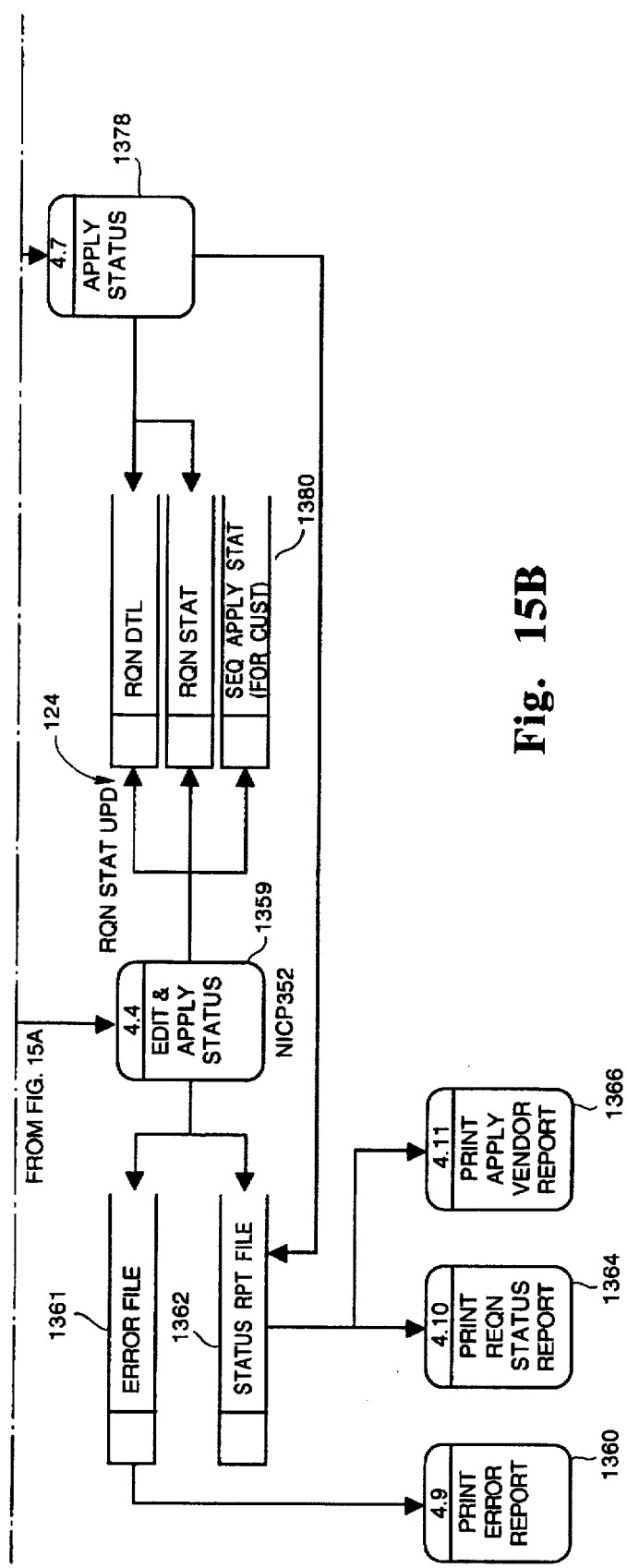
Figure 16A:
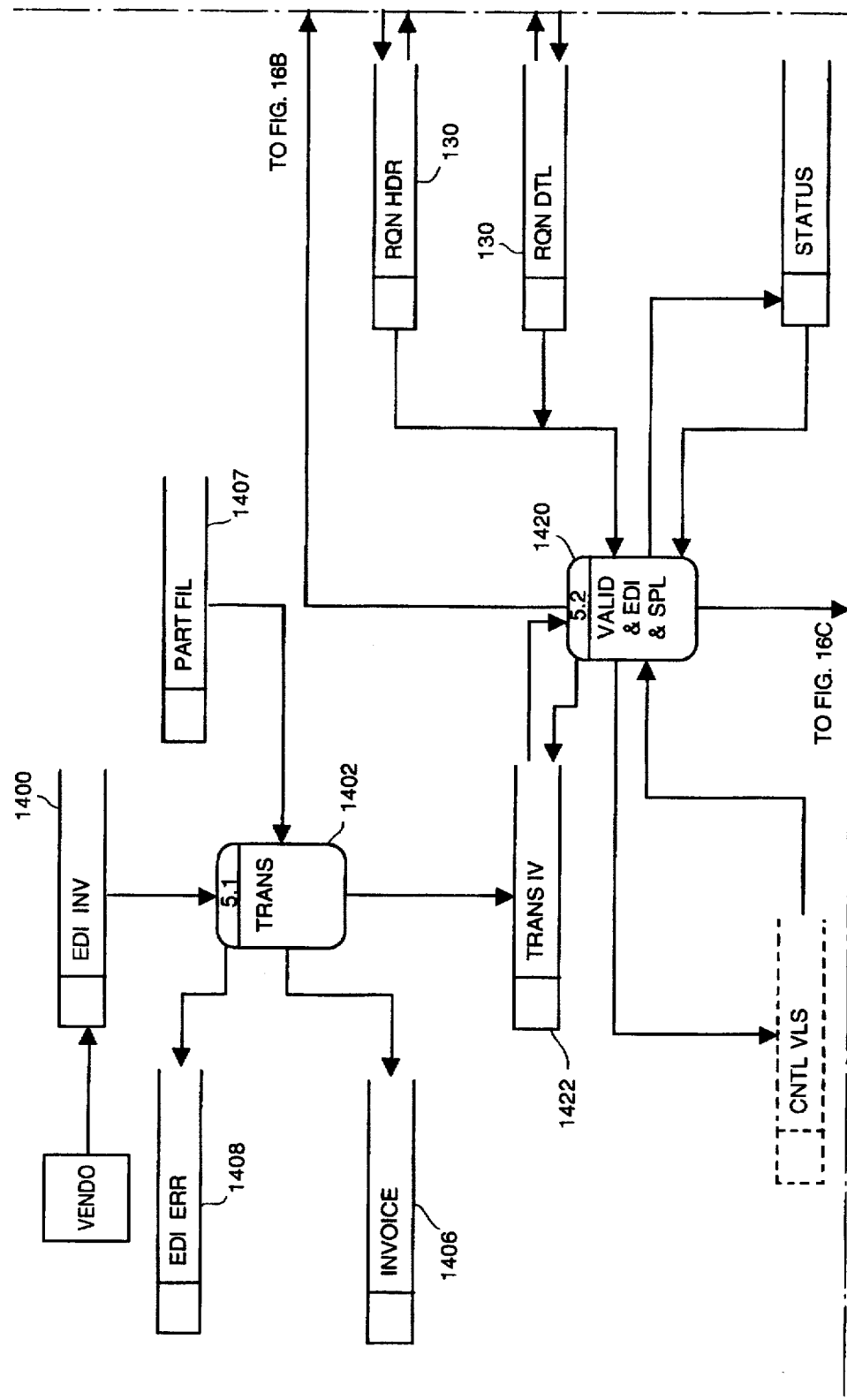
Figure 16C:
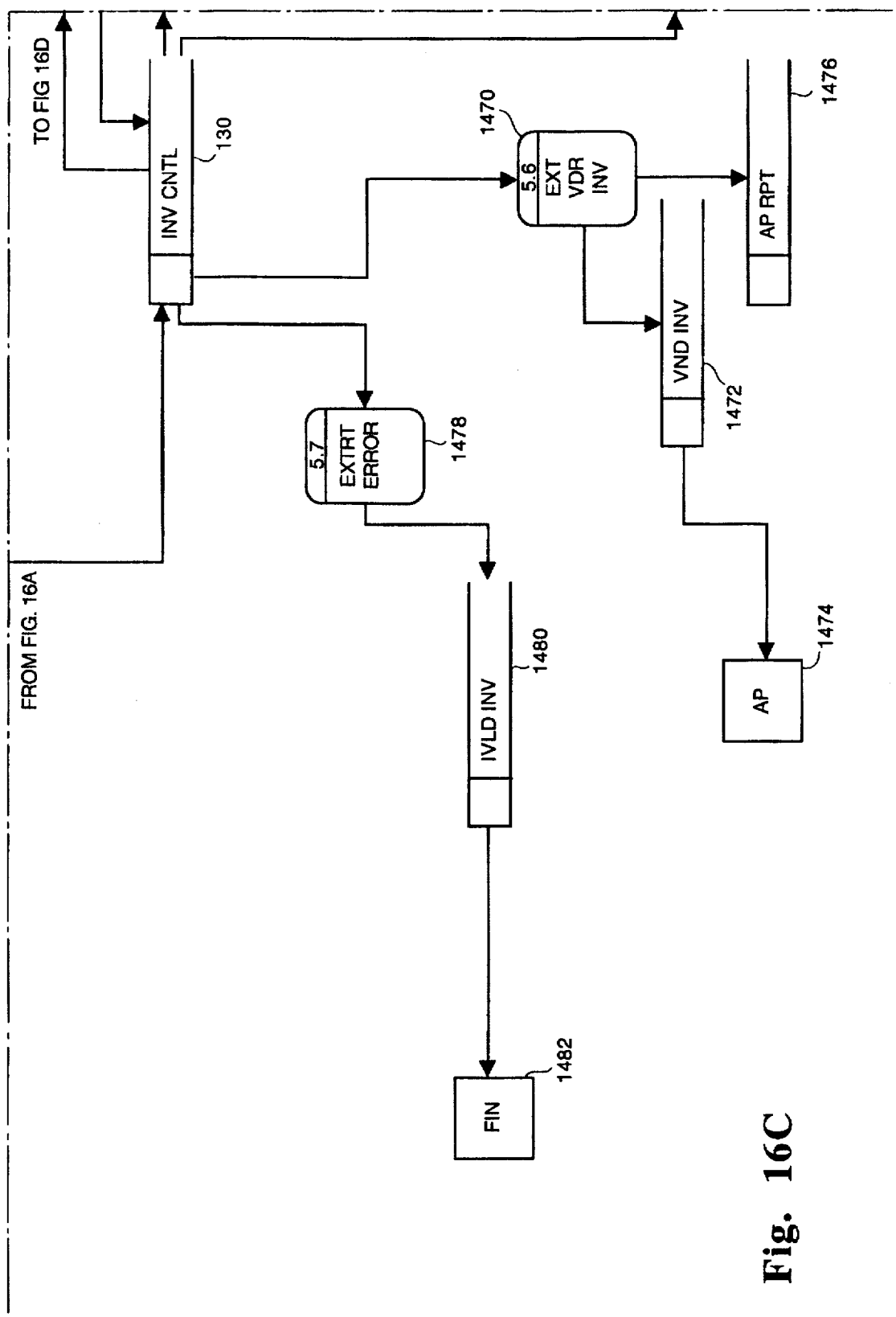
Figure 16D:
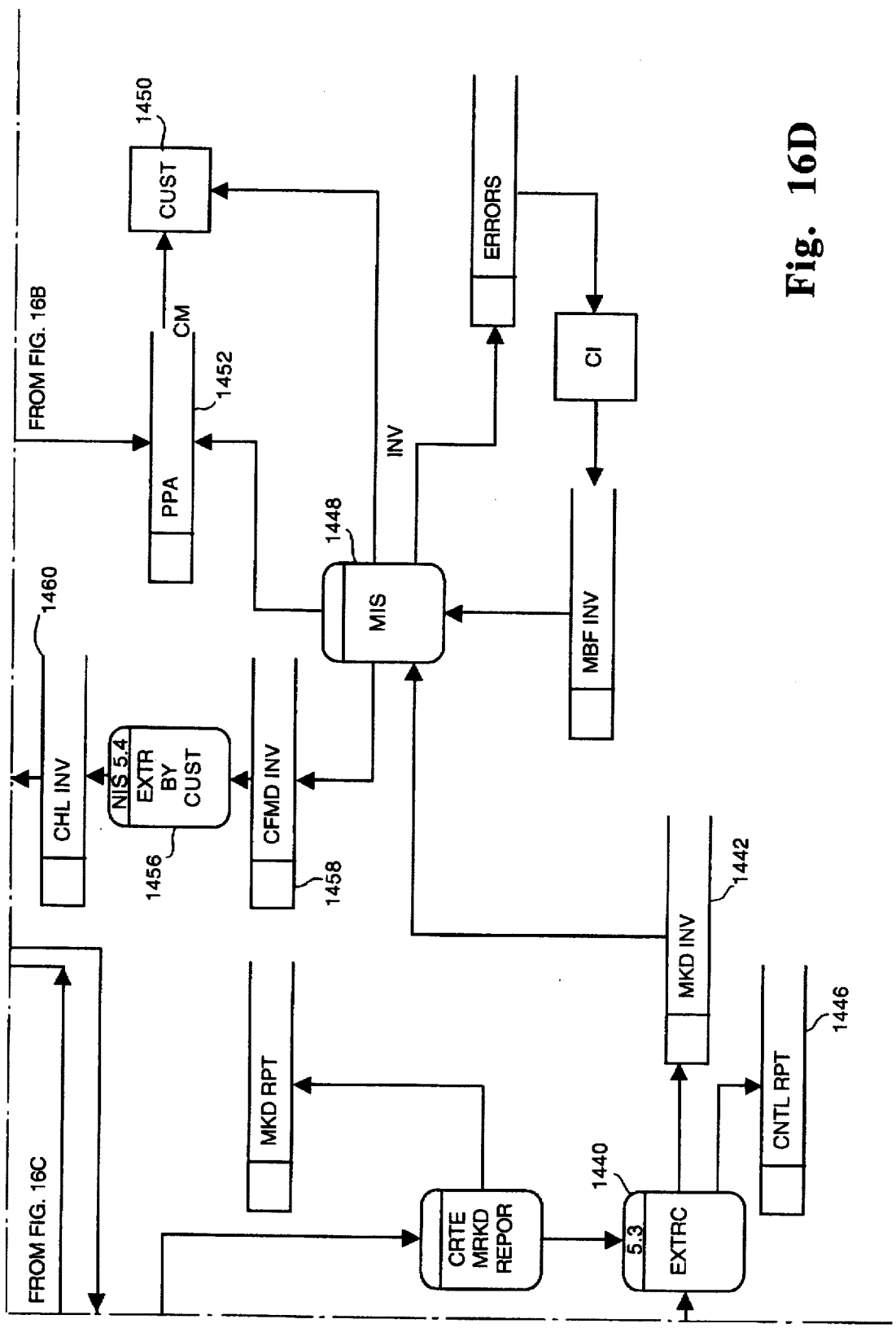
Figure 17:
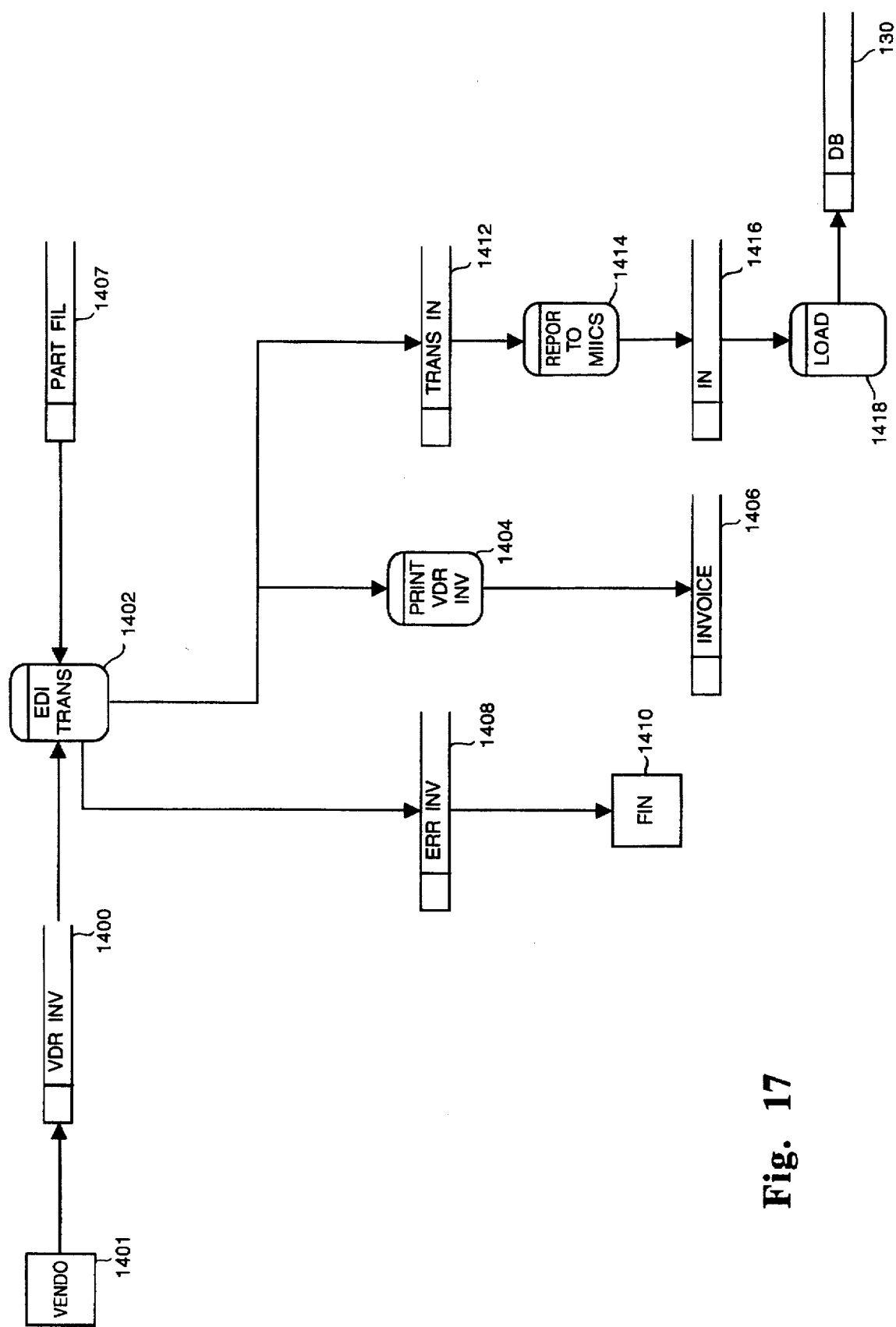
Figure 18:
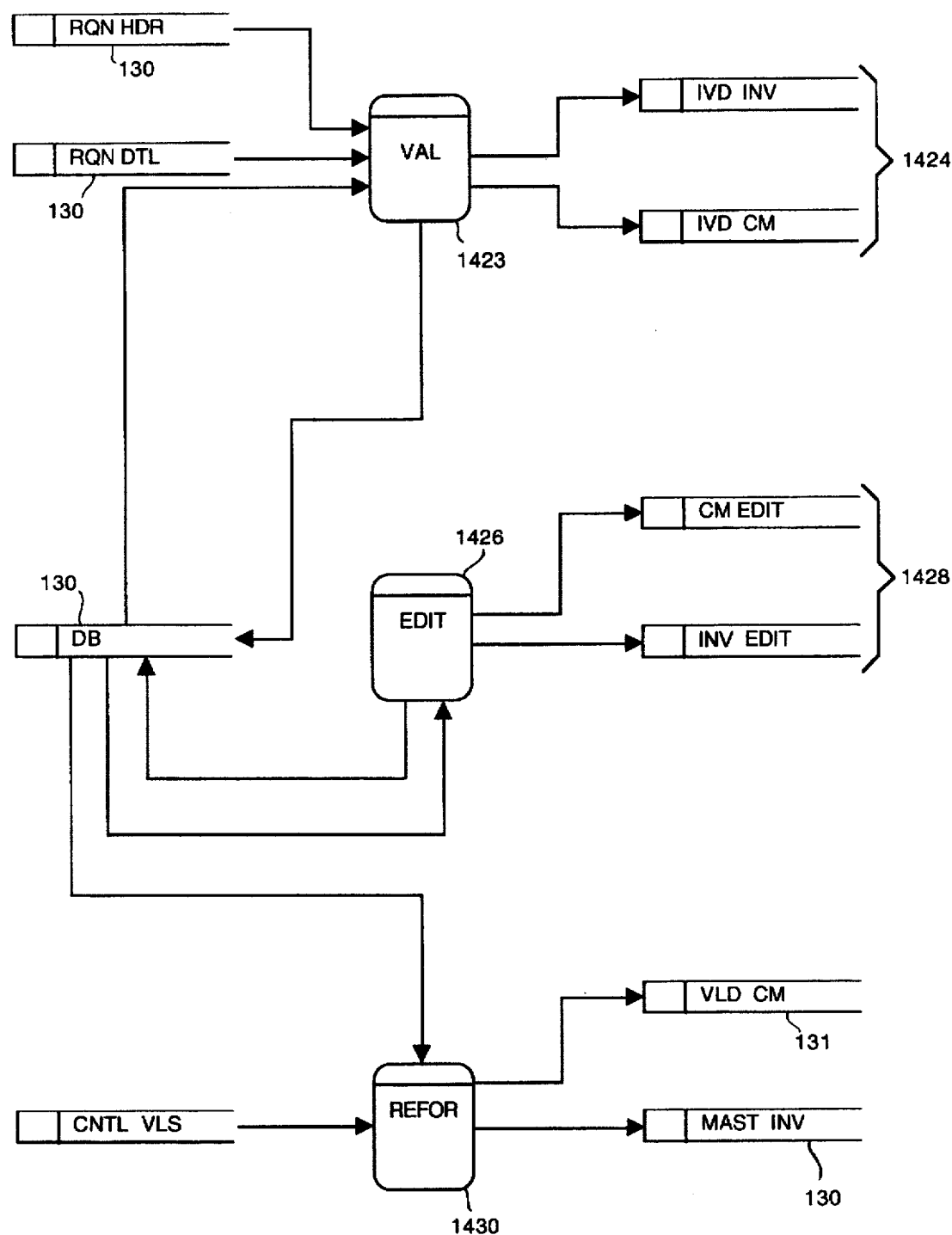
Figure 19:
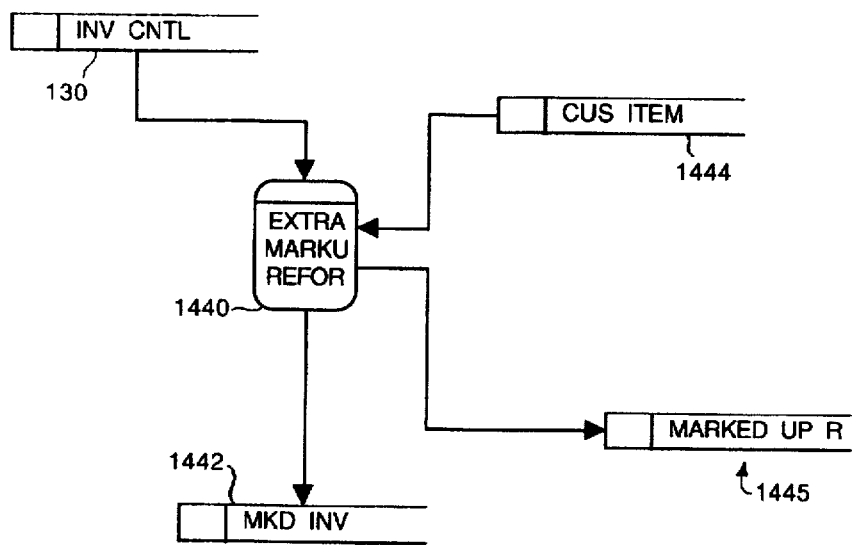
Figure 20:
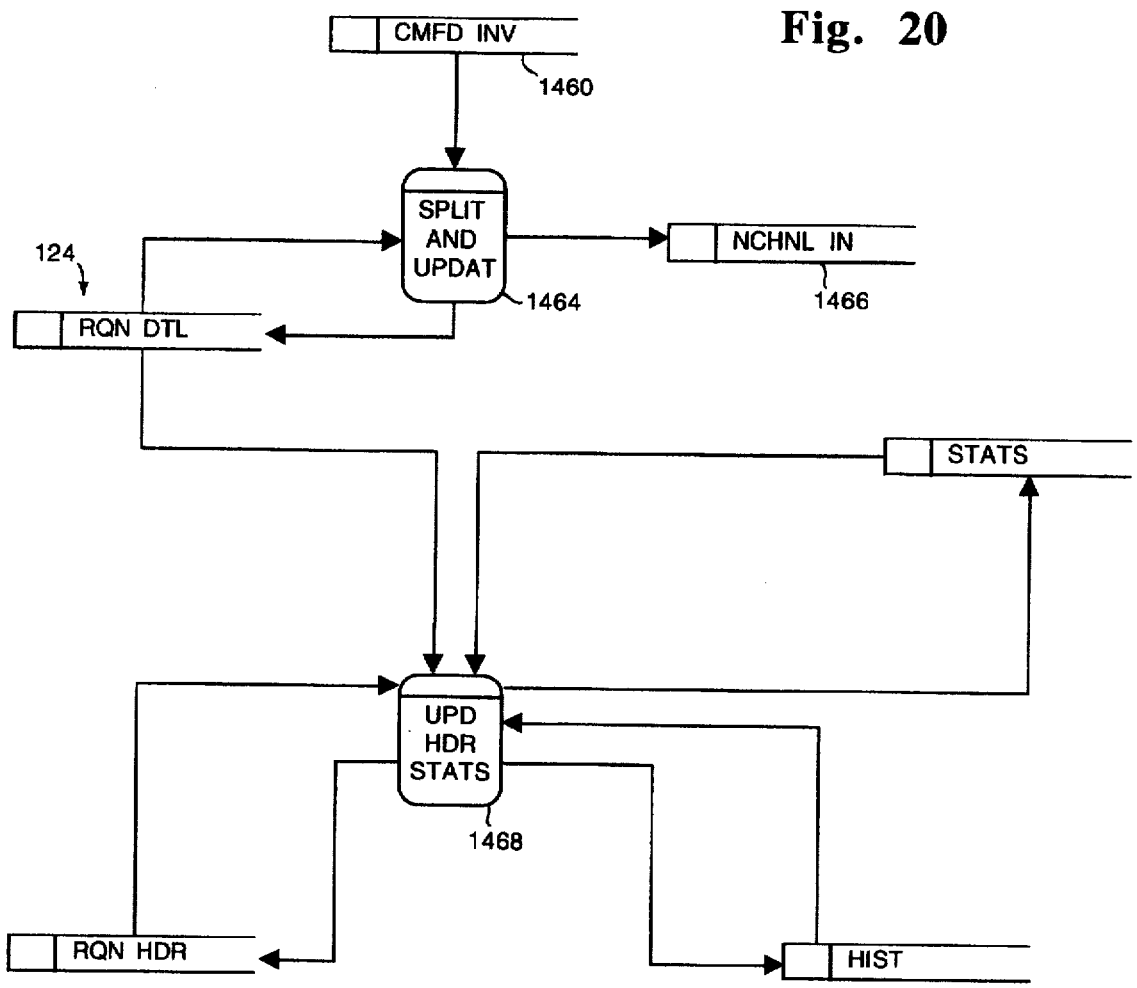

FIG. 15 shows the data processing flow for updating the status of requisition orders. In step 1350, a vendor transmitted requisition update file 1352 provided in a standard format, e.g., EDI, is reformatted 1354 for loading, step 1356 into the main system databases 102, and in particular the requisition database 124. The loaded reformatted data 1358 is compared to existing requisition data in step 1359. An error file 1361 and report are generated and the report printed, if necessary, in step 1360. A status report file 1362 is also generated and reports are printed on the status of the requisitions 1364 and of the appropriate vendor 1366. In addition, a substitution file 1368 is created when the data is reformatted in step 1350 and a substitution report is generated in step 1370.

In addition, when the new requisition status data files are loaded into the databases 102, then specific information is extracted from this data in step 1372, such as confirmed requisitions, and a sequential data file 1374 is created of that extracted information and maintained in the main database 102. In step 1376, for example, the individual requisitions for particular items may be grouped so as to order the items in standard bulk units, e.g., cartons, from the vendor or department. In step 1378, this file is used to update the requisition detail information in the requisition database 124 and to provide a requisition update file 1380 to be later transmitted to the customer to update the customer database.

FIGS. 16 to 20 show the data processing flow steps for processing invoices. Upon receipt of a vendor invoice 1400, in a standard EDI format that includes the price charged by the vendor 1401 to the central supplier, the main computer system translates and initially processes the invoice in step 1402. The invoices is printed in step 1404 as a printed invoice 1406 for control purposes. Moreover, an item shipped data file (PART FIL) 1407 for item orders filled, e.g., delivered by vendor or department, is accessed to supply data to confirm that invoices are not accepted for quantities shipped of any particular item. The items shipped data is provided from the vendor in order acknowledgement data. In addition, any errors in the transmitted invoice are documented in an error file 1408 and sent to a department, e.g., the financial (FIN) department 1410 for further processing. The reformatted invoice data (TRANS IN) 1412 is again reformatted in step 1414 into an appropriate database format file 1416 and then loaded in the invoice database 130 in step 1418.

In step 1420, the reformatted invoice data 1422 (which may include invoice or credit information) obtained from the requisition data file 130, including requisition header and detail data, is validated, step 1423, to confirm that the vendor invoice is a participating vendor in the computerized requisition system. Invoices received from non-participating vendors or for orders to be handled outside of the channel system are placed on data files 1424, unrelated to the present system, for invoices or credits from these vendors. Assuming that the invoice data is validated, then the data is edited, step 1426 for errors and report files, 1428, are generated of edited invoice and credit information.

In step 1430, the edited invoice data is again reformatted and annotated with requisition data 130, e.g., from requisition header and detail files (RQN HDR and RQN DTL), to conform to the master database 102 format and is then stored in the master database invoice file and master customer file (VLD CM) 131. (MAST INV) 130 and validated.

In step 1440, data on invoices that have been invoiced to the customer are extracted from the invoice file 130 and sent in a marked invoice file 1442 annotated with corresponding data, such as the price to be paid by the customer for the ordered items, from the customer item file 1444. A price mark-up data file 1445 may be used to convert the price for an item paid by the central supplier into the price charged to the customer for that item. In addition, control reports are generated with the marked invoice files. In step 1448, the invoice file data 1442 is reformatted into a standard invoice format and sent to the customer (CUST) 1450 from a invoicing service (NIS) via mail and/or an electronic data file 1452 that is annotated with data from a central invoicing department (CI) 1454.

In step 1456, the invoice confirmation data 1458 is extracted and associated with the appropriate customer invoicing files 1460, and then applied to update data in the databases in step 1462. In updating the databases, the confirmed invoice files 1460 correlated with the requisition database 124 and used to update 1464 the appropriate requisition detail files (RQN DTL). If the invoice data does not correspond to a requisition stored in the requisition database, then the data is placed in a non-channel invoice file 1466. The updated requisition detail files are applied to update the requisition header (REQ HDR), history (HIST) and statistics files in step 1468.

In step 1470, confirmed invoices are extracted from the invoice file 130 and forwarded as a vendor invoice file 1472 to an accounts payable department 1474 for payment of the vendor. Similarly, an accounts payable report is generated at step 1476. In step 1478, invoices with an extracted status, see file 1442, but not processed into a confirmed invoice, see file 1458, within a specified period, such as five days, are placed in an invalid invoice file 1480 and forwarded to a financial department 1482 for handling. Similarly, files and/or reports on valid and invalid credit memoranda (CM) and invoices found invalid for other reasons are also sent to the financial department 1482.

Figure 21:
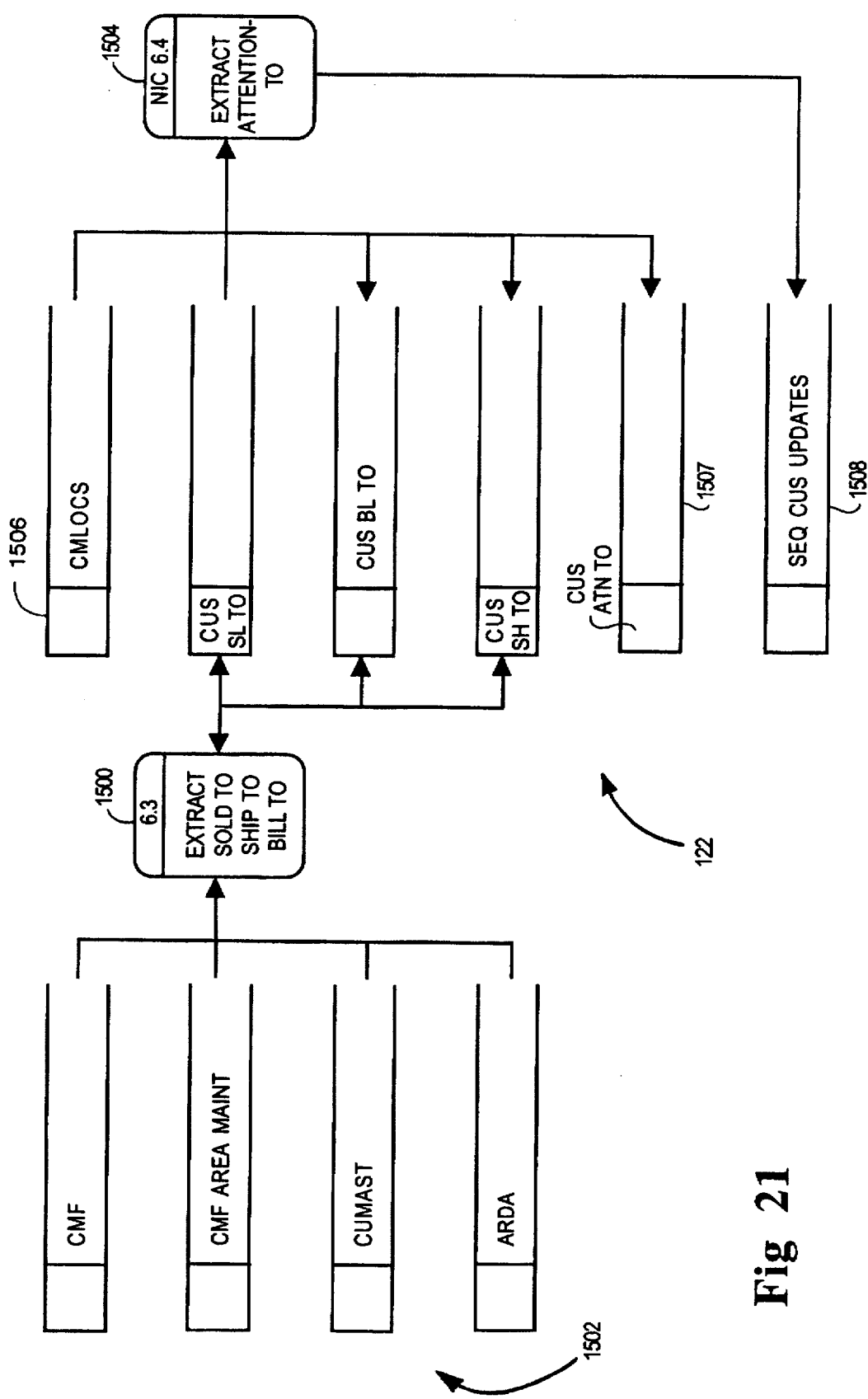

FIG. 21 shows the data processing flow for processing of source data from an internal department of the central supplier. In step 1500, data is extracted from various department files 1502, such as for maintaining customer data files and used to update customer files 122, such as sold-to, bill-to and ship-to files. In addition, in step 1504, customer attention file 1507, e.g., update, information is extracted from the updated customer files using the customer master location file 1506 as a driver to generate customer update 1508 data to be sent to the customer computer system to update the customer databases.

Figure 22:
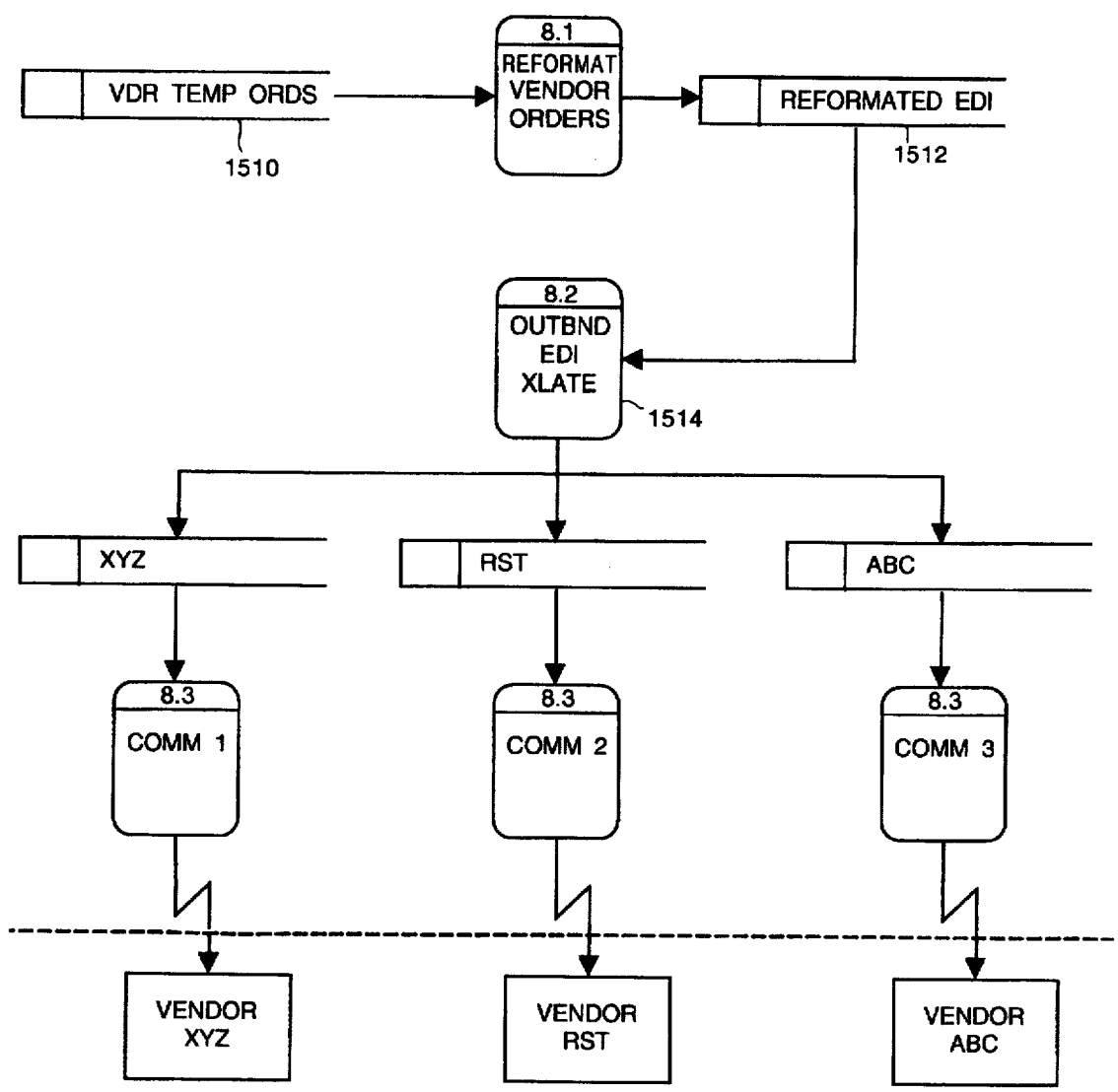
Figure 23:
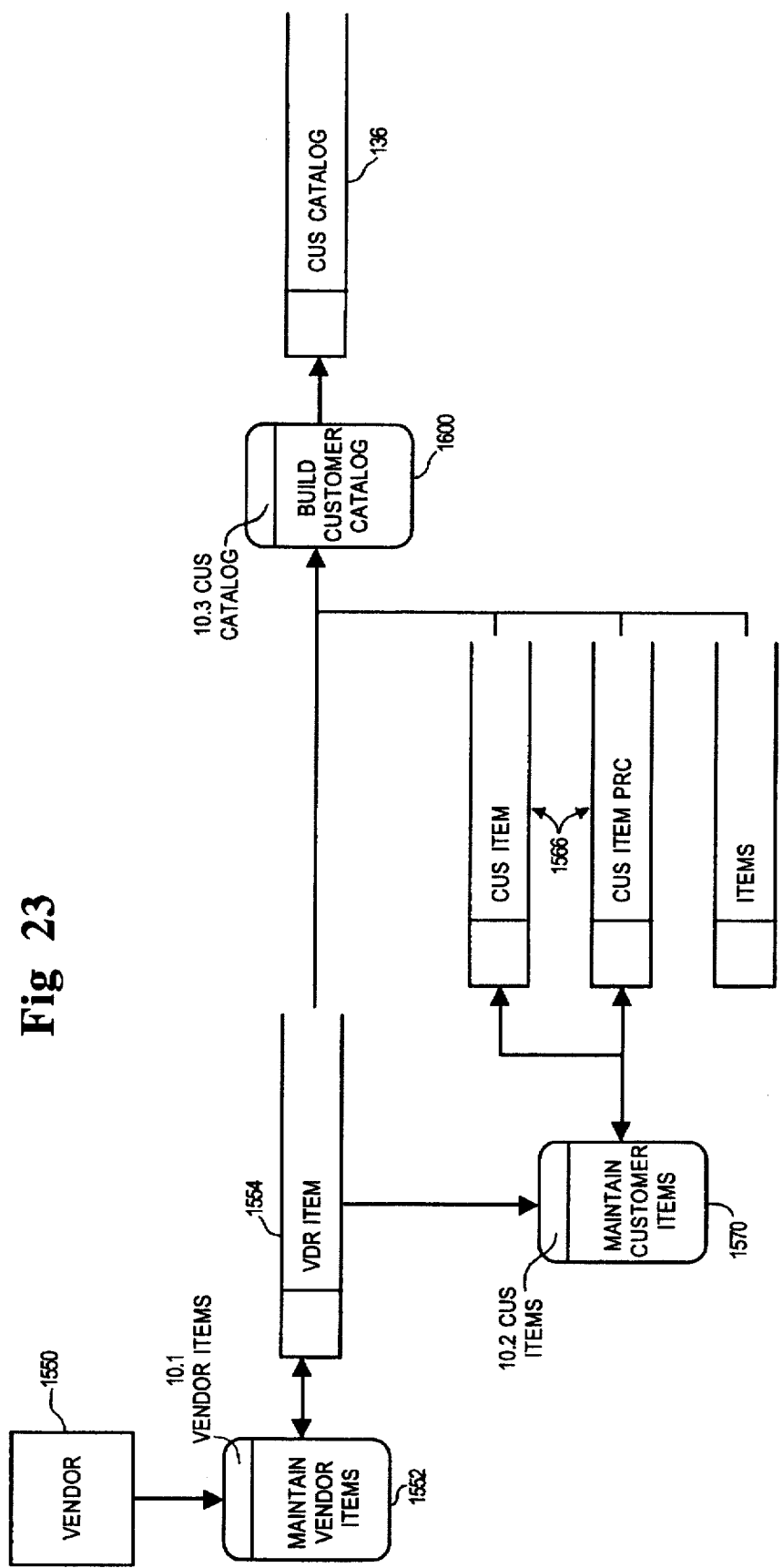
Figure 24:
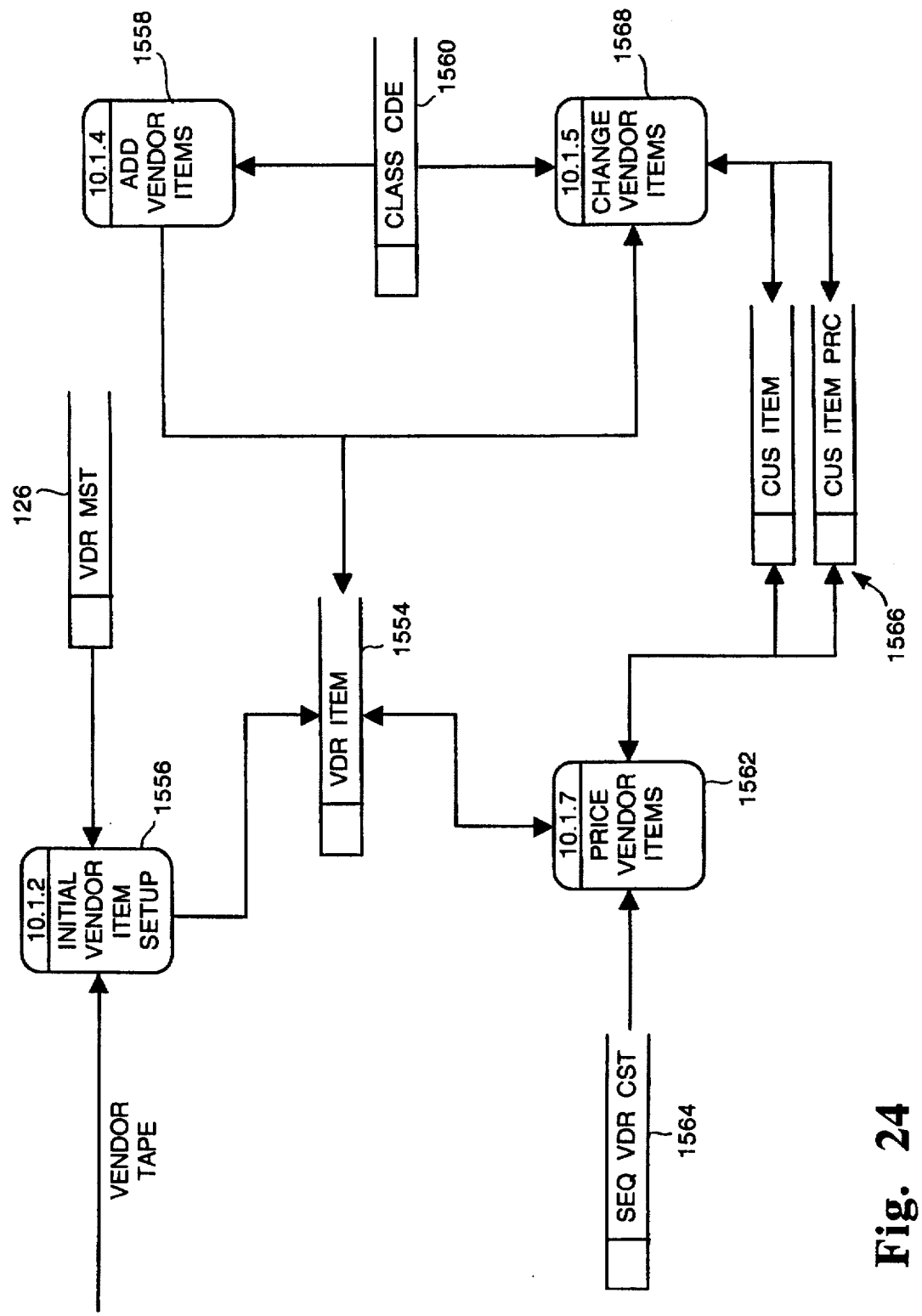
Figure 25:
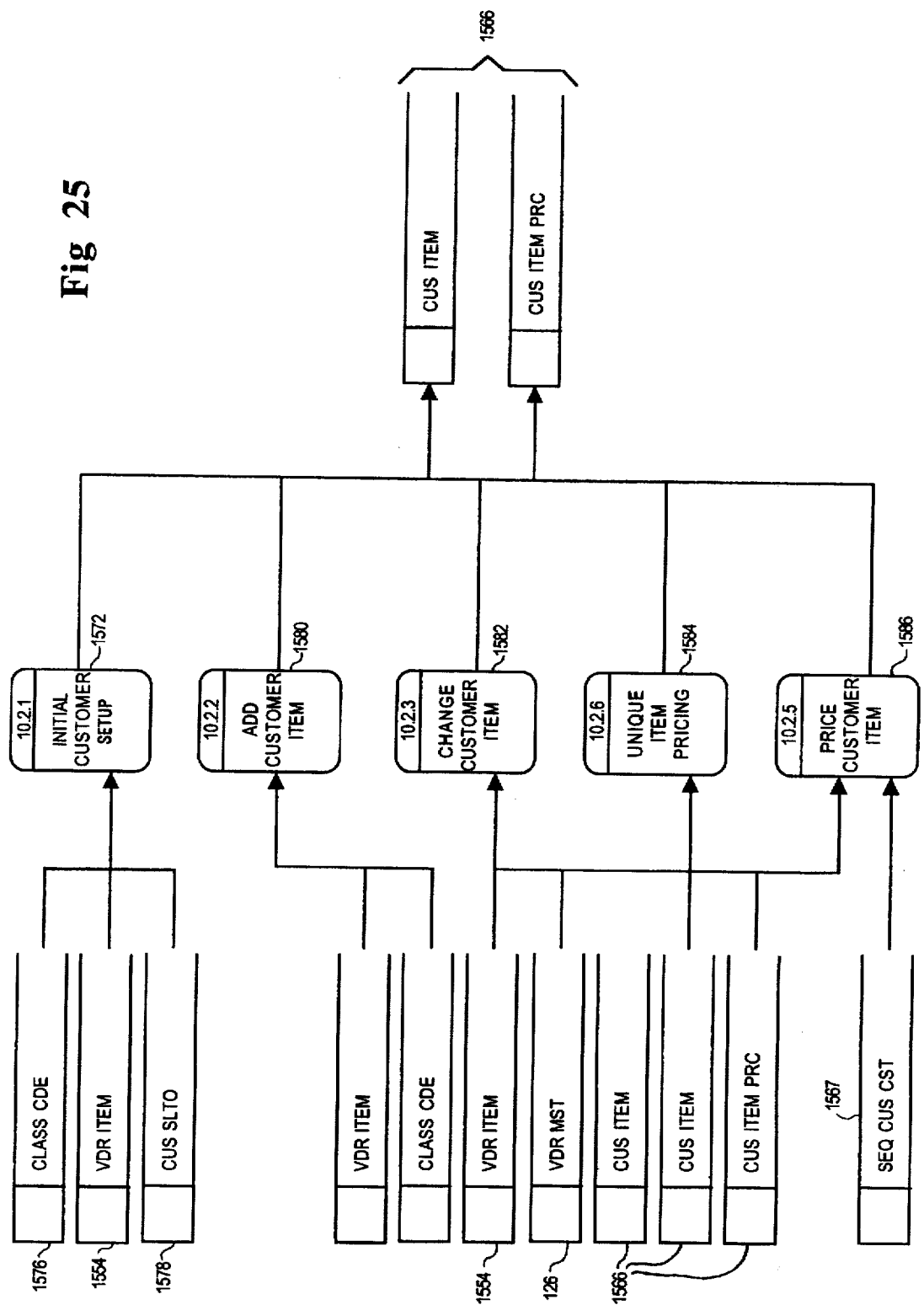
Figure 26:
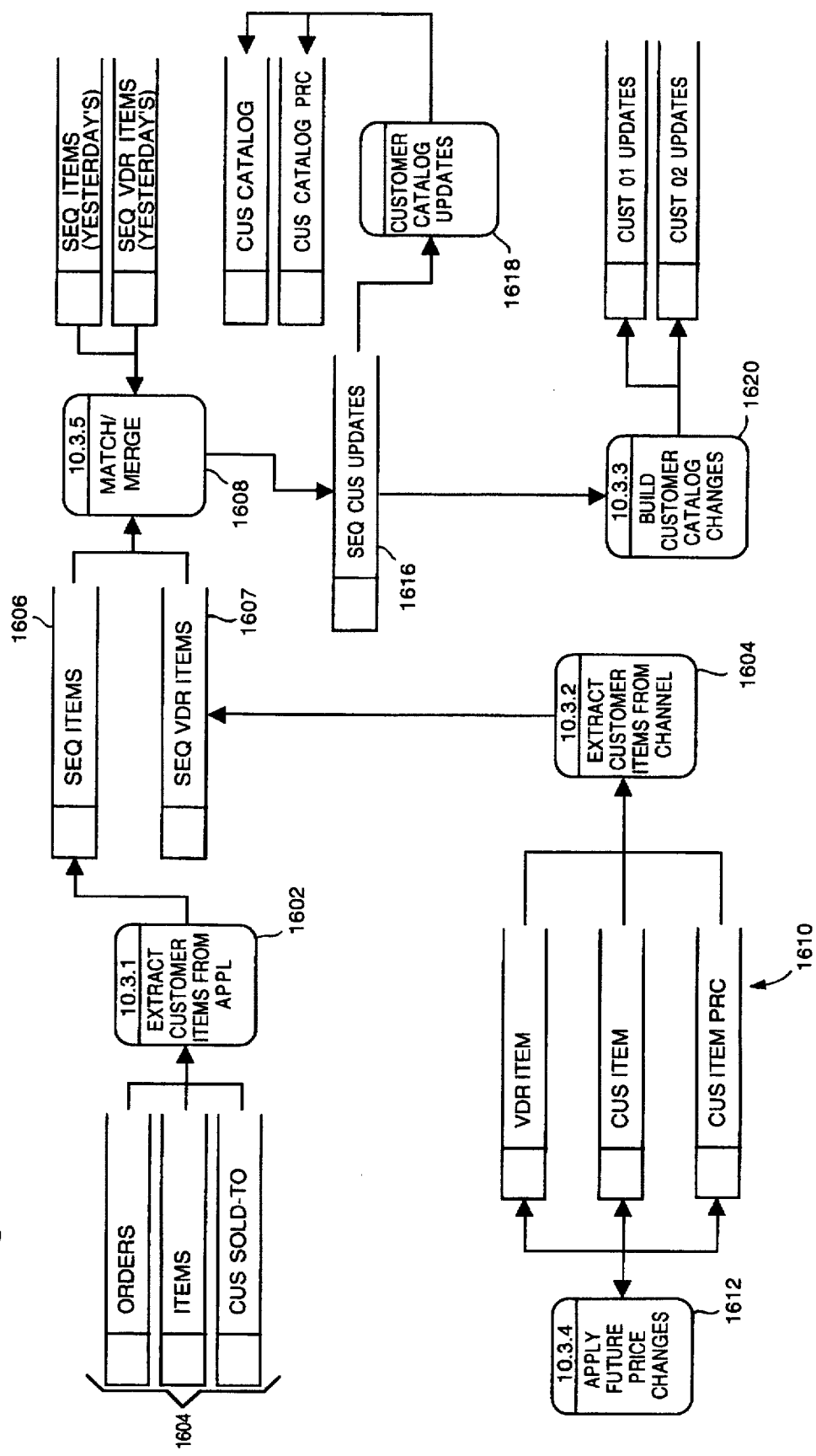

FIG. 22 shows the generation of vendor purchase orders from a vendor order file 1510 that contains data on the customer, items ordered and price to the central supplier. This data is reformatted into standard purchase order forms 1512 for each vendor in step 1514. These purchase orders are then electronically transmitted, step 1516, to the appropriate vendor.

FIGS. 23 to 26 show the data flow for assembling and maintaining a master item catalog 126 and the individual customer catalogs 136. Individual vendors 1550, provide data (see FIG. 13) to the central computer system regarding the items offered by that vendor, including the price to the central supplier, in step 1552. Each item in the master catalog 126 has an associated vendor item field 1554.

The master vendor item catalog 126 is initially assembled, in step 1556, from information provided from the vendor, such as an electronically readable tape. Subsequent items from a particular vendor are added to the master catalog in step 1558. All vendor items may be classified by a class code from a class code file 1560 or product group file from the general reference database file 128.

The price to the customer for each vendor item is established by the central supplier in step 1562 using data from a vendor cost file 1564. The price for each item may be established on an individual customer basis and loaded into files for the customer item catalog and item price 1566. Similarly, the customer price and item files can be updated when the vendor item data is changed in step 1568.

The individual customer catalogs 136 includes individual customer item data 1566. The customer initially selects the items to be offered in its customer catalog in step 1572 using data files on vendor items 1554, product classes and groups 1576, and customer sold to data 1578. The customer items may be later added to, step 1580, or changed, step 1582. Usually, the customer item files are generated at the central supplier rather than at the customer computer system. In addition, customer pricing, step 1586, and unique item pricing, step 1548, may be applied to items listed in the customer item data files 1566. In addition, previously supplied cost data (SEQ CUS CST) 1567 may also be maintained.

The customer catalog 136 is assembled, step 1600, by extracting, 1602, data from prior item order files, 1604, for that customer to generate a data file 1606 for comparing and merging, step 1608, data 1607 extracted, step 1609, data on items in the master catalog and other data files 1610. These files are periodically updated to, for example, make price changes in step 1612. The resulting data file 1616 containing customer catalog updates is applied to update the customer catalog in steps 1618 and 1620.

The invention has been described in connection with what is presently considered the preferred embodiment. The invention is not limited to this embodiment. Rather, the invention covers various modifications and equivalent arrangements included within the spirit and scope of the appended claims.

What is claimed is:

1. A requisition tracking system comprising:
    a central computer system having a memory containing data files and a data communication unit for communicating with other computer systems, said central computer system
    (i) maintaining said data files containing data on customers, customer initiated requisitions, invoicing and product items,
    (ii) electronically receiving requisition orders identifying products requisitioned by individual customers, where the requisition orders are received from a plurality of customer computer systems, and wherein a first requisition order from a first customer requisitions quantities of various products selected by the first customer, and a second requisition order from a second customer requisitions quantities of various products selected by the second customer,
    (iii) generating purchase orders for the products from information in the requisition orders, wherein the purchase orders each include at least one or more identifier codes that identify one or more of the individual customers, and wherein a first group of purchase orders identifies the first and second customers and the quantities of at least a first product of the various products selected by the first and second customers, and a second group of purchase orders identifies the first and second customers and the quantities of at least a second product of the various products selected by the first and second customers,
    (iv) individually addressing each purchase order to a selected vendor, including addressing the first group of purchase orders to a first vendor of the first product and the second group of purchase orders to a second vendor of the second product,
    (v) transmitting each purchase order to a vendor computer system for the selected vendor;
    (vii) receiving vendor invoices from a plurality of vendor computer systems, wherein said invoices identify the purchase orders that each vendor has accepted for delivery, and
    (viii) extracting customer billing information from the vendor invoices to centrally generate customer invoices to be sent to each customer for the products selected by the customer and that the vendors have agreed to deliver to the customer;
    each of said customer computer systems having a communication unit for electronically communicating with said central computer system to transmit customer data and said requisition orders for requisitional product items, and having a memory with data files containing data on requisitions and product items, and
    each of said vendor computer systems having a communication unit for electronically communicating with said central computer system for receiving said purchase orders, for identifying the individual customers to receive products requisitioned in the purchase orders, and for transmitting said invoices having data including an acceptance of a requisition order.

2. A requisition tracking system as in claim 1 wherein said data on product items is in the form of an electronic catalog accessible via said customer computer systems and identifying products available for requisition.

3. A requisition tracking system as in claim 2 wherein said electronic catalog includes data uniquely identifying product items by an alphanumeric designation, description, keywords and product category codes, and said catalog being searched using one of said customer computer systems by keyword and product category codes.

4. A requisition tracking system as in claim 1 wherein said central computer system reformats data from said invoices from a plurality of vendor computer systems into individual customer invoices and electronically transmits said customer invoices to said customer computer systems.

5. A requisition tracking system as in claim 1 wherein said central computer system maintains said customer initiated requisition data files with current status data that indicates whether a requisitioned product item has been shipped to a customer and said vendor computer systems transmits status data to said central computer system indicating that said requisitioned items have been shipped.

6. A requisition tracking system as in claim 5 wherein said central computer system transmits said current status data regarding the requisitional product items to said customer computer systems.

7. A requisition tracking system as in claim 1, wherein said customer computer system periodically transmits update data indicative of an authorized customer and said central computer system maintains said customer data files by updating the customer data files with said update data received from said customer computer systems.

8. A requisitioning computer system as in claim 1 wherein said data files in said central computer system include historical data on the customers derived from said customer computer systems, requisition orders, and product items, and said central computer system processes said historical data in generating a report of certain selected extracts of said historical data.

9. A requisition system comprising:
    a central computer system at a first location having data files containing information on customers, product catalogs, suppliers of products, customer requisitions of products wherein the requisitions include a first requisition for at least first and second products from a first customer, and second requisition for at least the first and second products from a second customer, purchase orders, and invoices,
    a communication unit for receiving the customer requisitions from a plurality of customer computer systems and invoices from a plurality of vendor computer systems, and for transmitting the purchase orders to the vendor computer systems;

a processing unit for selecting vendors to supply customer requisitioned products and services, for extracting information from the first and second requisitions information regarding the first and second products and first and second customers, and for generating the purchase orders for each selected vendor that identifies a requisitioned product and identifies two or more customers to receive the requisitioned product, and identifies the selected vendor to deliver the requisitioned product directly to each of the identified customers, and wherein the purchase orders include a first group of purchase orders for a first vendor supplying the first product identifying the quantities of the first product requisitioned by each of the first and second customers, and a second group of purchase orders for a second vendor supplying the second product identifying the quantities of the second product requisitioned by each of the first and second customers, and generates customer invoices from vendor invoices which identify the products to be delivered to the respective customers and a charge for the products to be paid by the customers wherein;

the plurality of customer computer systems are at locations remote from said central computing system and receive data from the data files in the central computer system including catalogs, and transmit requisition orders for one or more products selected from the catalogs; and the plurality of vendor computer systems receive, accept and process the purchase orders received from the central computer system, generate the vendor invoices containing product shipping information, and product cost information and transmit the invoices to the central computer.

* * * * *